(12) United States Patent
Heinrich et al.

(10) Patent No.: US 7,752,755 B2
(45) Date of Patent: Jul. 13, 2010

(54) METHODS AND APPARATUS FOR MANUFACTURING COMPONENTS

(75) Inventors: Todd G. Heinrich, Cincinnati, OH (US); Mark E. Leeds, Mason, OH (US); Joseph C. Roesel, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1307 days.

(21) Appl. No.: 11/250,737

(22) Filed: Oct. 14, 2005

(65) Prior Publication Data

US 2007/0084052 A1    Apr. 19, 2007

(51) Int. Cl.
*B21D 53/78* (2006.01)
(52) U.S. Cl. .............................. 29/889; 29/464; 29/559; 29/281.1; 29/281.5; 33/568; 33/573; 269/254 R
(58) Field of Classification Search ............... 29/889, 29/889.2, 889.21, 889.22, 889.7, 559, 464, 29/281.5, 283; 33/549, 568, 573; 269/254 R, 269/254 CS
See application file for complete search history.

(56) References Cited

U.S. PATENT DOCUMENTS

| | | | | |
|---|---|---|---|---|
| 1,033,531 A | * | 7/1912 | Brown | 294/86.27 |
| 2,790,361 A | * | 4/1957 | Swanson et al. | 269/20 |
| 2,854,756 A | * | 10/1958 | Aller | 33/552 |
| 3,608,885 A | * | 9/1971 | Roth | 269/158 |
| 3,689,059 A | * | 9/1972 | Gross | 269/100 |
| 4,033,569 A | * | 7/1977 | Dunn | 269/26 |
| 4,327,495 A | * | 5/1982 | Plante | 29/889.22 |
| 4,638,602 A | * | 1/1987 | Cavalieri | 451/365 |
| 4,705,331 A | * | 11/1987 | Britton | 439/387 |
| 4,805,351 A | * | 2/1989 | Dobson et al. | 451/28 |
| 5,107,599 A | * | 4/1992 | Marincic et al. | 33/573 |
| 5,137,263 A | * | 8/1992 | Savoie et al. | 269/266 |
| 5,182,855 A | * | 2/1993 | Martin | 29/889.22 |
| 5,377,456 A | * | 1/1995 | Dixon | 451/364 |
| 5,481,811 A | * | 1/1996 | Smith | 33/573 |
| 5,515,615 A | * | 5/1996 | Twigg et al. | 33/551 |
| 5,544,873 A | * | 8/1996 | Vickers et al. | 269/47 |
| 6,068,541 A | * | 5/2000 | Dwyer | 451/28 |
| 6,073,360 A | * | 6/2000 | Struble | 33/783 |
| 6,426,622 B1 | * | 7/2002 | Givens et al. | 324/262 |
| 6,560,890 B1 | * | 5/2003 | Madge et al. | 33/549 |
| 6,568,993 B1 | * | 5/2003 | Jones et al. | 451/28 |
| 6,652,369 B2 | * | 11/2003 | Jones et al. | 451/365 |
| 6,830,240 B2 | * | 12/2004 | Jones et al. | 269/32 |
| 6,842,995 B2 | * | 1/2005 | Jones et al. | 33/645 |
| 6,844,515 B2 | * | 1/2005 | Byrnes et al. | 219/69.11 |
| 6,855,033 B2 | * | 2/2005 | Jones et al. | 451/28 |
| 6,931,751 B2 | * | 8/2005 | LaTulippe | 33/573 |

(Continued)

*Primary Examiner*—David P Bryant
*Assistant Examiner*—Christopher M Koehler
(74) *Attorney, Agent, or Firm*—William Scott Andes, Esq.; Armstrong Teasdale LLP

(57) ABSTRACT

A method for manufacturing a turbine nozzle assembly using a fixture including a biasing mechanism. The method includes moving the biasing mechanism from a biased first position to a second position using at least one of hydraulic, pneumatic, and electrical power, positioning at least one datum of the turbine nozzle assembly adjacent at least one datum location point on the fixture, and aligning the turbine nozzle assembly at least one datum with the at least one datum location point by releasing the biasing mechanism such that the biasing mechanism moves from the second position into contact with the turbine nozzle assembly.

15 Claims, 19 Drawing Sheets

U.S. PATENT DOCUMENTS

| | | | |
|---|---|---|---|
| 7,178,254 B2 * | 2/2007 | Couture | 33/573 |
| 7,178,255 B1 * | 2/2007 | Roesel et al. | 33/645 |
| 7,334,306 B2 * | 2/2008 | Beverley et al. | 29/281.1 |
| 7,547,007 B1 * | 6/2009 | Pietrantoni et al. | 269/8 |
| 7,578,164 B2 * | 8/2009 | Sherlock et al. | 73/1.79 |
| 2005/0268461 A1 * | 12/2005 | Ouellette et al. | 29/889.7 |
| 2006/0059676 A1 * | 3/2006 | Jones et al. | 29/464 |

* cited by examiner

METHODS AND APPARATUS FOR MANUFACTURING COMPONENTS

BACKGROUND OF THE INVENTION

This invention relates generally to manufacturing components, and more specifically to methods and apparatus for aligning, supporting, and/or securing components for manufacture.

Accurate manufacturing of gas turbine engine components may be a significant factor in determining both manufacturing timing and cost. For example, when the component is a gas turbine engine nozzle assembly, accurate manufacturing of the nozzle may be a significant factor affecting an overall cost of fabrication of the gas turbine engine, as well as subsequent modifications, repairs, and inspections of the blade. To align a component for manufacture, the component may be coupled to a fixture that includes at least one surface that locates a plurality of datums on the component. However, accurately aligning the component and holding the component in such alignment during manufacturing processes may be difficult. Accordingly, aligning the component may be more time consuming and/or require specialized operator training, possibly increasing manufacturing cycle times and manufacturing costs. Moreover, some machined surfaces may include datums that are used to locate the component for subsequent manufacturing processes. An accuracy of the dimensions of such machined surfaces may therefore determine an accuracy of the dimensions of other surfaces of the component that are subsequently machined, as well as the overall dimensions of the finished component.

BRIEF DESCRIPTION OF THE INVENTION

In one aspect, a method is provided for manufacturing a turbine nozzle assembly using a fixture including a biasing mechanism. The method includes moving the biasing mechanism from a biased first position to a second position using at least one of hydraulic, pneumatic, and electrical power, positioning at least one datum of the turbine nozzle assembly adjacent at least one datum location point on the fixture, and aligning the turbine nozzle assembly with the at least one datum with the at least one datum location point by releasing the biasing mechanism such that the biasing mechanism moves from the second position into contact with the turbine nozzle assembly.

In another aspect, an assembly for use in manufacturing a turbine nozzle assembly includes a fixture having at least one datum location point, and at least one biasing mechanism coupled to the fixture and including a biased first position and a second position. The at least one biasing mechanism is configured to align at least one datum of the turbine nozzle assembly with the at least one datum location point by moving from the second position toward the first position and into contact with the turbine nozzle assembly when the turbine nozzle assembly is positioned adjacent the fixture and the at least one biasing mechanism. The assembly also includes an actuating member coupled to the fixture and configured to move the at least one biasing mechanism against the bias to the second position using at least one of pneumatic, hydraulic, and electrical power.

In another aspect, an assembly for use in manufacturing a turbine nozzle assembly includes a fixture, and at least one biasing mechanism coupled to the fixture and including a biased first position and a second position. The at least one biasing mechanism is configured to apply force to the turbine nozzle assembly when the turbine nozzle assembly is positioned adjacent the at least one biasing mechanism and the fixture by moving from the second position toward the first position and into contact with the turbine nozzle assembly to facilitate at least one of aligning the turbine nozzle assembly relative to the fixture, supporting the turbine nozzle assembly, and fixedly securing the turbine nozzle assembly to the fixture. The assembly also includes an actuating member coupled to the fixture and configured to move the at least one biasing mechanism against the bias to the second position using at least one of pneumatic, hydraulic, and electrical power.

DETAILED DESCRIPTION OF THE INVENTION

As used herein, the terms "manufacturing" and "manufacture" may include any process for shaping and/or evaluating a component, such as, but not limited to fabrication and/or inspection. As used herein the terms "machining," "machine," and "machined" may include any process used for shaping a component. For example, processes used for shaping a component may include, but are not limited to including, turning, planing, milling, grinding, finishing, polishing, and/or cutting. In addition, and for example, shaping processes may include, but are not limited to including, processes performed by a machine, a machine tool, and/or a human being. The above examples are intended as exemplary only, and thus are not intended to limit in any way the definition and/or meaning of the terms "machining," "machine," and "machined".

As used herein, the terms "inspection" and "inspecting" may include any inspection process. For example, inspection processes may include measurement by a machine, measurement by humans, visual inspection by a machine, and/or visual inspection by a human. The above examples are intended as exemplary only, and thus are not intended to limit in any way the definition and/or meaning of the terms "inspection" and "inspecting". In addition, as used herein the term "component" may include any object that has been or may be manufactured.

Figure 1:
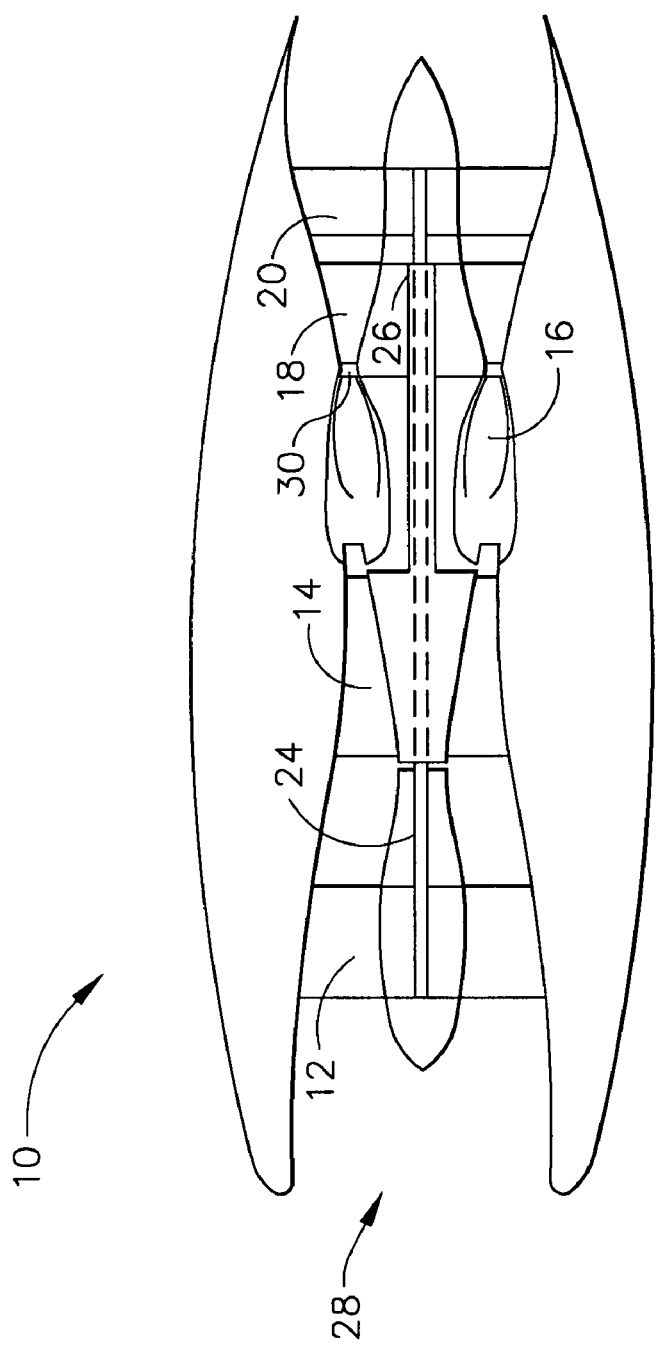
FIG. 1 is a schematic of an exemplary gas turbine engine.

FIG. 1 is a schematic illustration of an exemplary gas turbine engine 10 including a low pressure compressor 12, a high pressure compressor 14, and a combustor 16. Engine 10 also includes a high pressure turbine 18, and a low pressure turbine 20 arranged in a serial, axial flow relationship. Compressor 12 and turbine 20 are coupled by a first shaft 24, and compressor 14 and turbine 18 are coupled by a second shaft 26. In one embodiment, gas turbine engine 10 is an LMS100 engine commercially available from General Electric Company, Cincinnati, Ohio. In operation, air flows through low pressure compressor 12 from an upstream side 28 of engine 10. Compressed air is supplied from low pressure compressor 12 to high pressure compressor 14. Highly compressed air is then delivered to combustor assembly 16 where it is mixed with fuel and ignited. Combustion gases are channeled from combustor assembly 16 to drive turbines 18 and 20.

Figure 2:
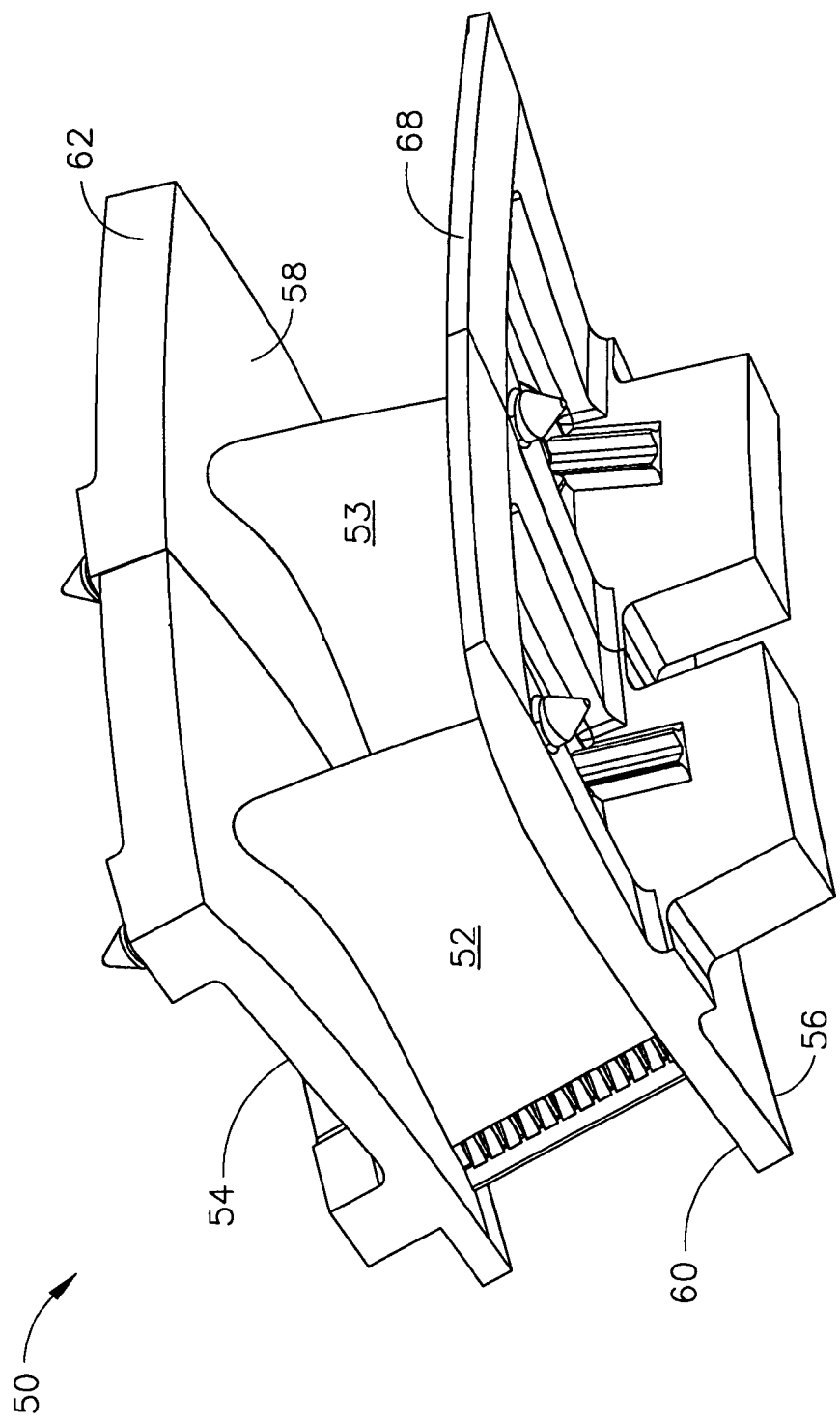
FIG. 2 is a perspective view of an exemplary turbine nozzle assembly for use in a gas turbine engine, such as the exemplary gas turbine engine shown in FIG. 1.
Figure 3:
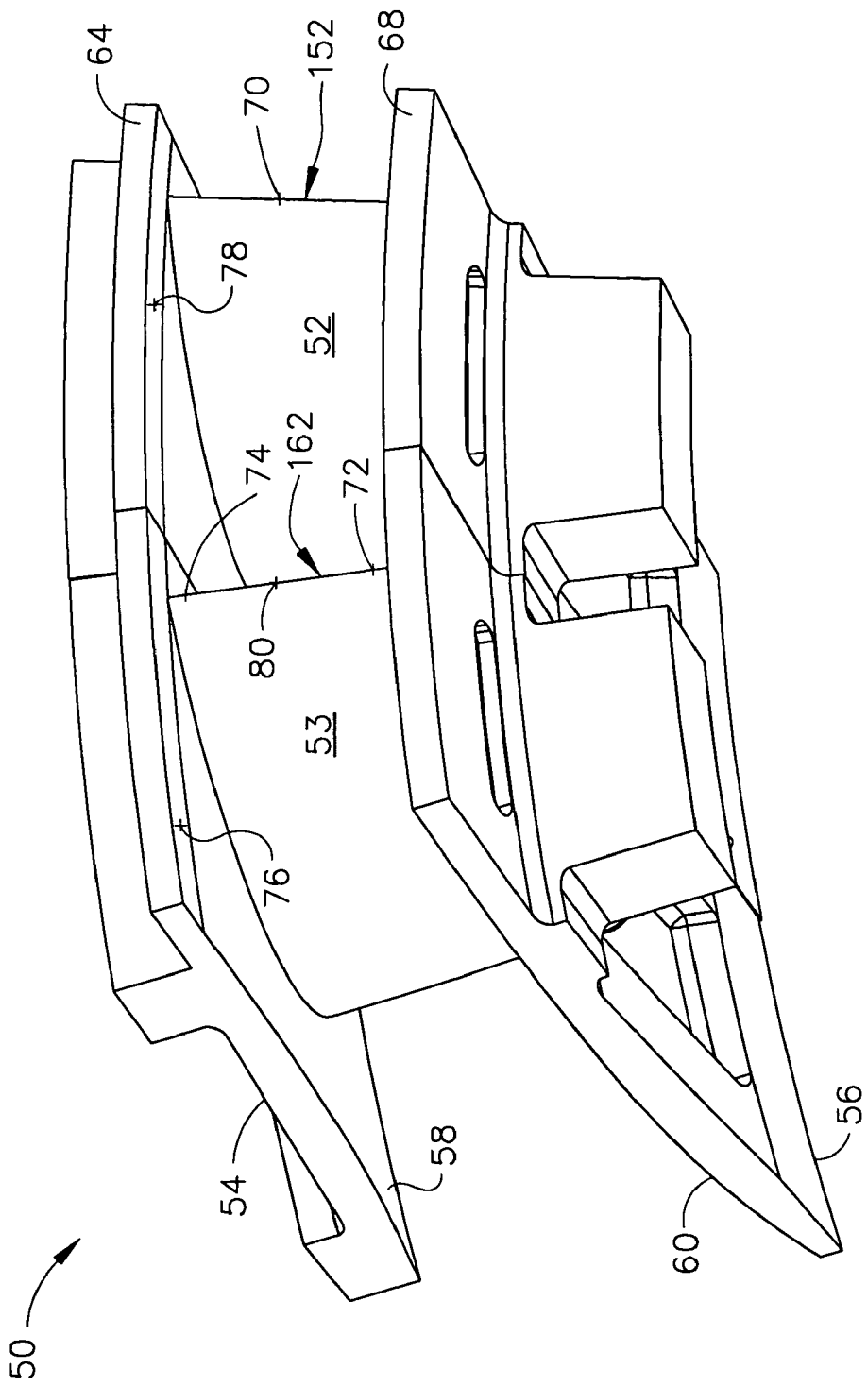
FIG. 3 is another perspective view of the exemplary turbine nozzle shown in FIG. 2.

FIGS. 2 and 3 are perspective views of an exemplary turbine nozzle assembly 50 that may be used with a gas turbine engine, such as engine 10 (shown in FIG. 1). In the exemplary embodiment, nozzle assembly 50 includes two airfoils 52 and 53 and is generally known as a doublet. In such an embodiment, a plurality of turbine nozzle assemblies 50 are circumferentially coupled together to form turbine nozzle ring 30 (shown in FIG. 1). In the exemplary embodiment, doublet 50 includes a plurality of circumferentially-spaced airfoils 52 and 53 coupled together by an arcuate radially outer band or platform 54, and an arcuate radially inner band or platform 56. More specifically, in the exemplary embodiment, each band 54 and 56 is integrally-formed with airfoils 52 and 53, and each doublet 50 includes two airfoils 52 and 53. In an alternative embodiment, a nozzle assembly that includes a single airfoil 52 or 53 and is generally known as a singlet. In yet another alternative embodiment, a nozzle assembly that includes three airfoils, such as airfoils 52 and 53 and another airfoil (not shown), is generally known as a triplet. In the exemplary embodiment, outer band 54 includes a radially inner surface 58 and inner band 56 includes a radially inner surface 60. Inner surfaces 58 and 60 define a flow path for combustion gases to flow through turbine nozzle assembly 50. In the exemplary embodiment, the combustion gases are channeled through turbine nozzle assembly 50 to turbines 18 or 20 (shown in FIG. 1). Outer band 54 includes a forward face 62 and an aft face 64. Similarly, inner band 56 includes a forward face 66 and an aft face 68. In the exemplary embodiment, turbine nozzle assembly 50 includes a plurality of datums 70, 72, 74, 76, 78, and 80 to facilitate orientating turbine nozzle assembly 50 for a manufacturing process, as will be described in more detail below.

Figure 4:
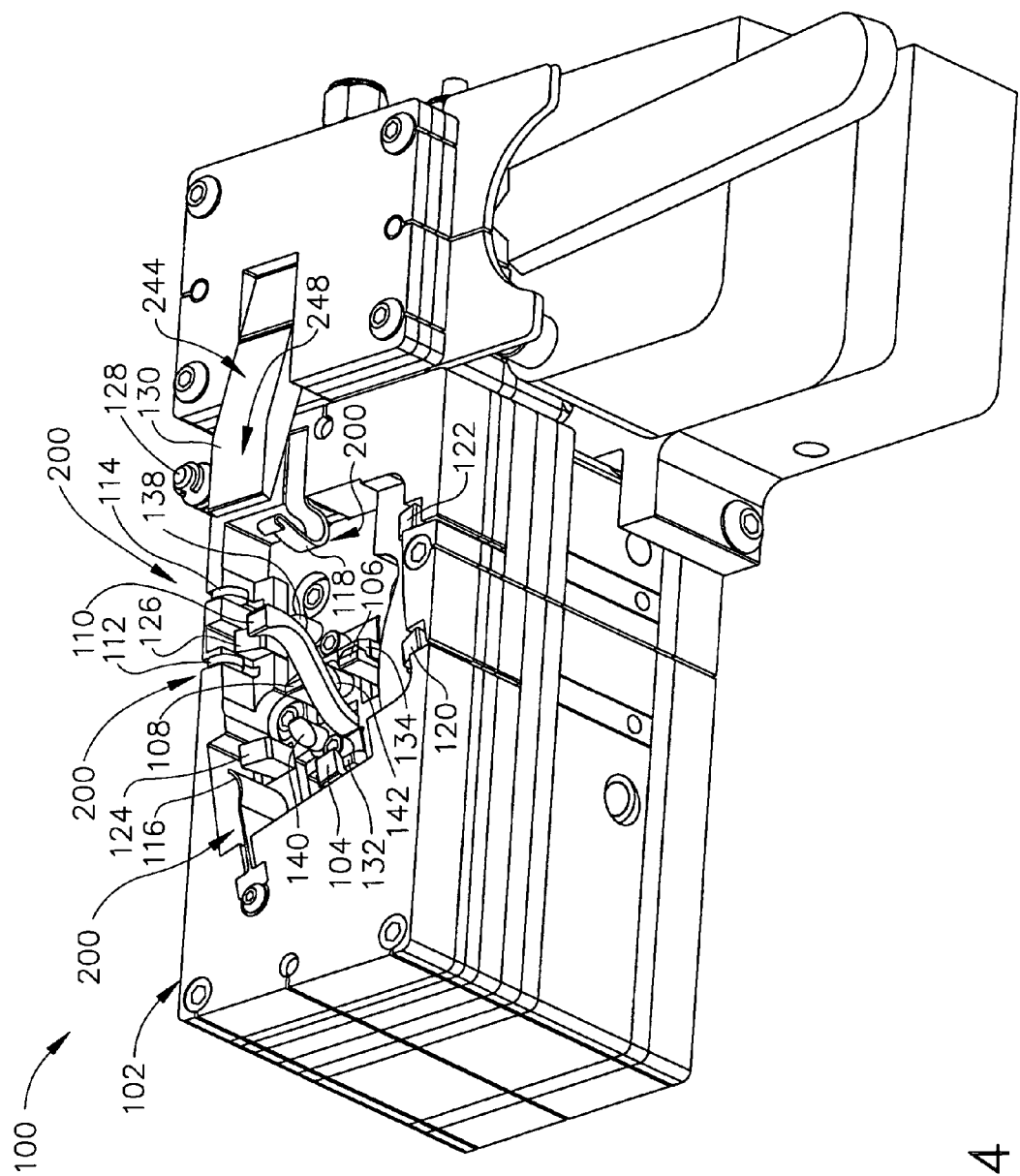
FIG. 4 is a perspective view of an exemplary embodiment of a fixture assembly for use in manufacturing a component, such as the exemplary turbine nozzle assembly shown in FIGS. 2 and 3.
Figure 5:
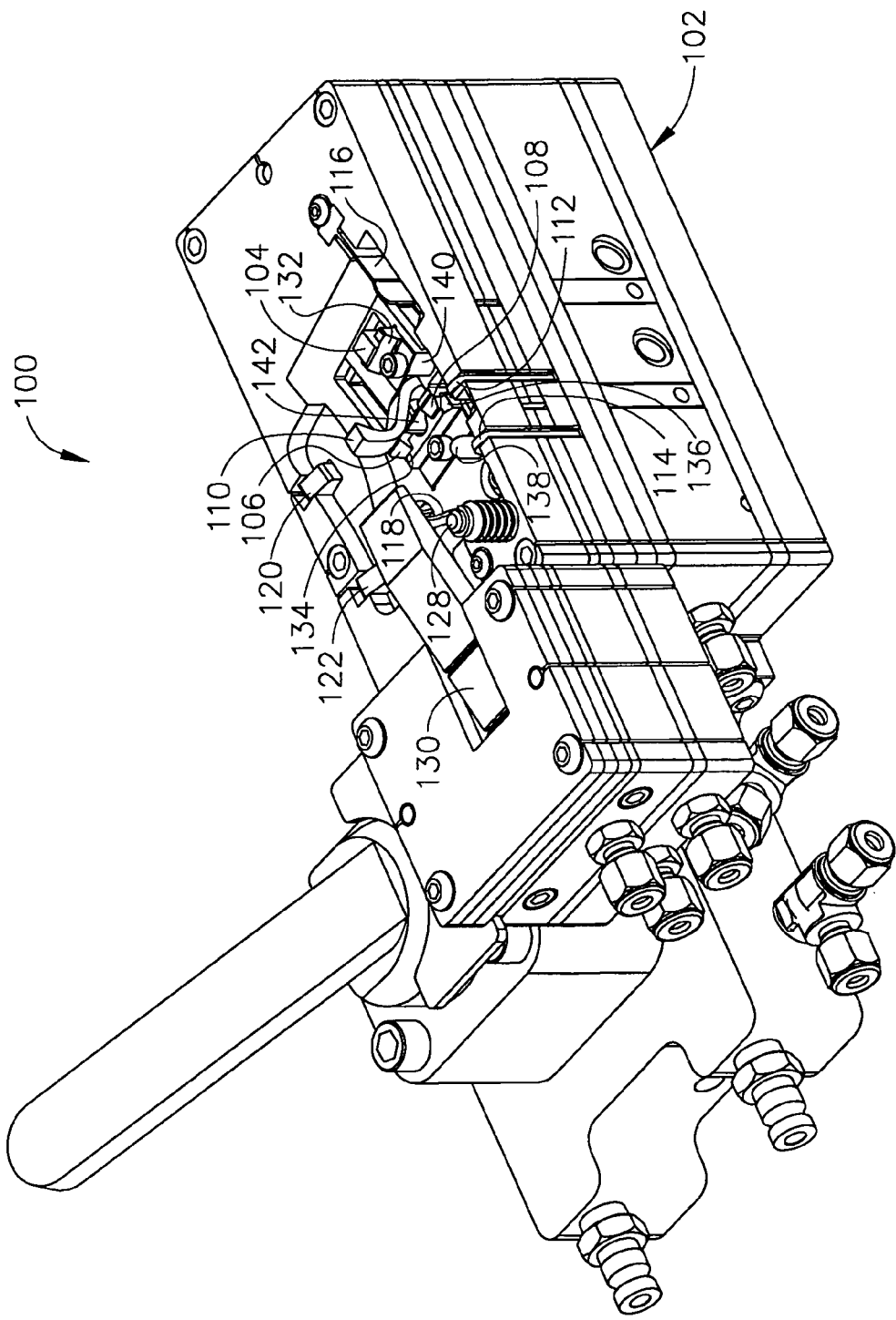
FIG. 5 is a perspective view of the exemplary fixture assembly shown in FIG. 4.
Figure 6:
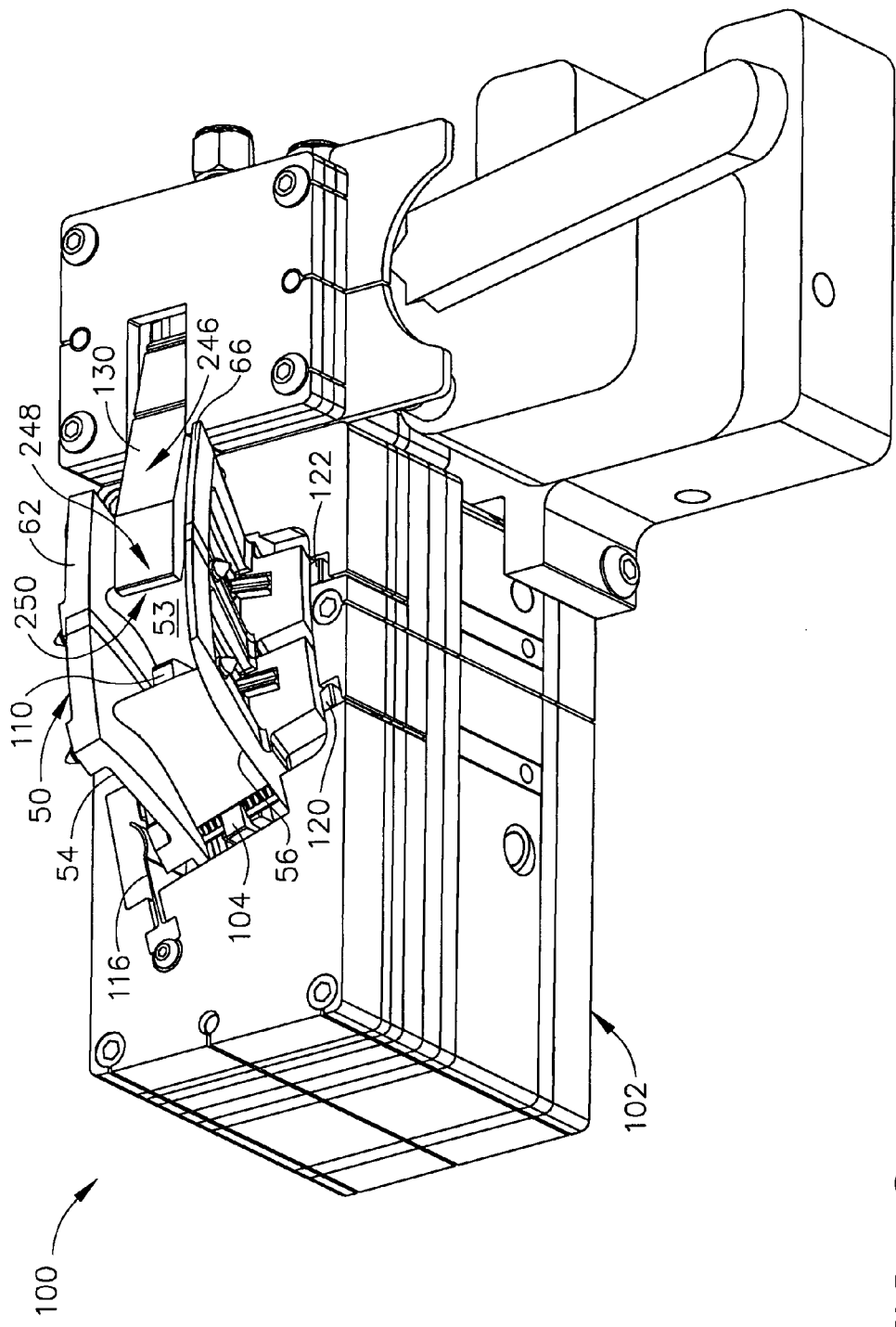
FIG. 6 is a perspective view of the exemplary fixture assembly shown in FIGS. 4 and 5 having the exemplary turbine nozzle assembly shown in FIGS. 2 and 3 fixedly secured thereto.
Figure 7:
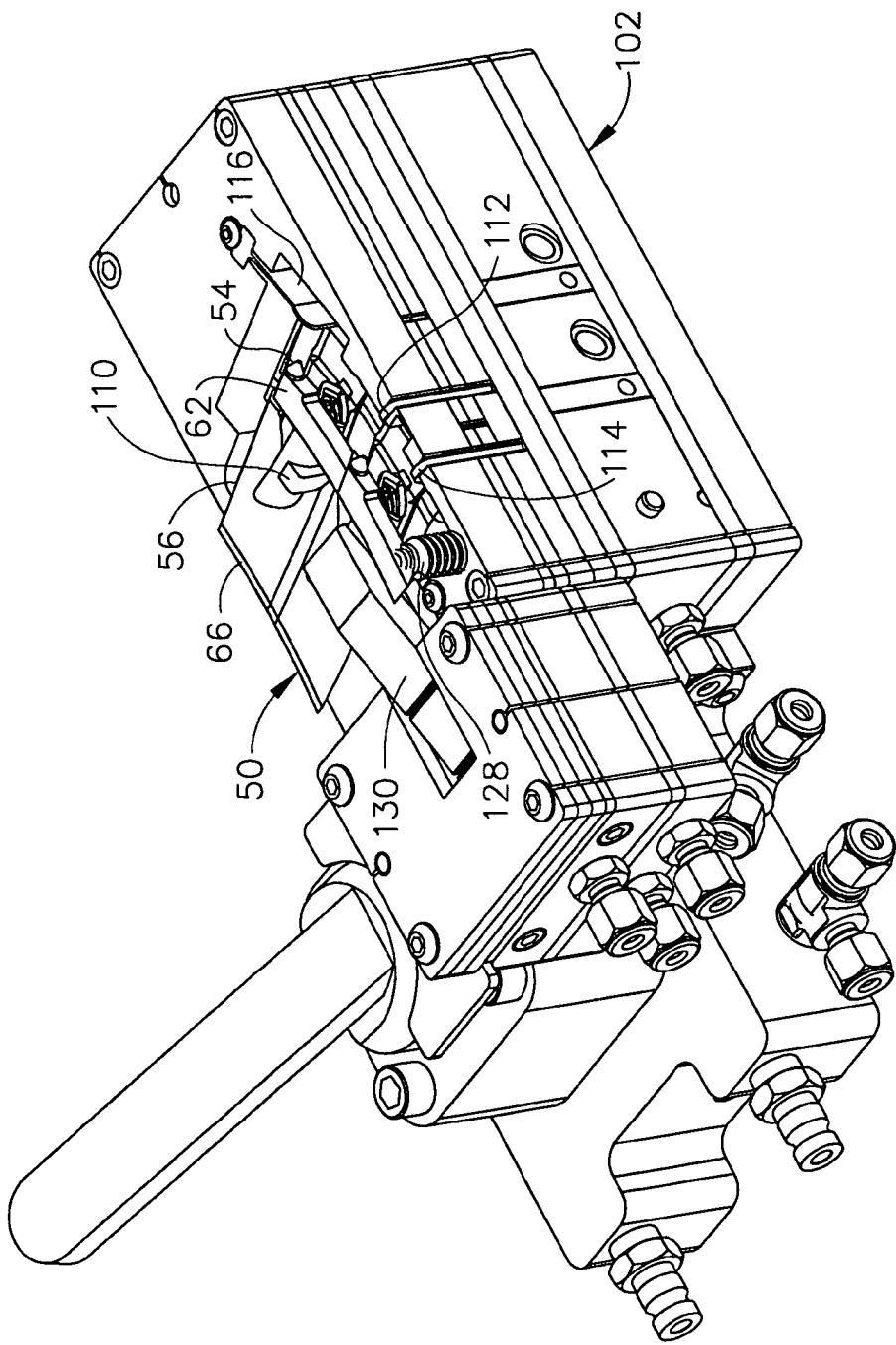
FIG. 7 is another perspective view of the exemplary fixture assembly shown in FIGS. 4-6 having the exemplary turbine nozzle assembly shown in FIGS. 2 and 3 fixedly secured thereto.

FIGS. 4 and 5 are perspective views of an exemplary embodiment of a fixture assembly 100 for use in manufacturing a component. Although fixture assembly 100 may be used to manufacture any component, for example components of any operable shape, size, configuration, and/or material(s), in the exemplary embodiment fixture assembly 100 is used in manufacturing turbine nozzle assembly 50 (shown in FIGS. 2 and 3). FIGS. 6 and 7 are perspective views of fixture assembly 100 having turbine nozzle assembly 50 fixedly secured thereto and orientated relative to fixture 102 for a manufacturing process. It should be appreciated that the specific size, shape, and/or configuration of fixture assembly 100 described and/or illustrated herein is exemplary only. Accordingly, the specific size, shape, and/or configuration of fixture assembly 100 generally, as well as portions thereof, may be selected to accommodate other components than turbine nozzle assembly 50.

Fixture assembly 100 generally includes a fixture 102, a plurality of biasing mechanisms 104, 106, 108, 110, 112, 114, 116, and 118 coupled to fixture 102, a plurality of work supports 120, 122, 124, 126, and 128 coupled to fixture 102, and a clamp 130 coupled to fixture 102. As will be described in more detail below, biasing mechanisms 104, 106, 108, 110, 112, 114, 116, and/or 118 facilitate fixedly securing turbine nozzle assembly 50 to fixture 102 and/or aligning turbine nozzle assembly 50 relative to fixture 102. Work supports 120, 122, 124, 126, and/or 128 facilitate supporting turbine nozzle assembly 50 relative to fixture 102, and clamp 130 facilitates fixedly securing turbine nozzle assembly 50 to fixture 102. Fixture assembly 100 may be positioned adjacent a machining tool (not shown) and/or an inspection tool (not shown) for machining and/or inspecting various surfaces of turbine nozzle assembly 50, such as, in the exemplary embodiment, forward faces 62 and 66 of turbine nozzle assembly outer and inner bands 54 and 56, respectively. It should be appreciated that the specific size, shape, and/or configuration of fixture assembly 100 generally, as well as portions thereof, may be selected to align, support, and/or fixedly secure turbine nozzle assembly 50 in orientations that accommodate machining and/or inspecting other turbine nozzle assembly surfaces than forward faces 62 and 66.

In some embodiments, forward faces 62 and 66 that have been machined, for example using fixture assembly 100, include datums (not shown) that are used to locate turbine nozzle assembly 50 for subsequent manufacturing processes that facilitate forming a finished turbine nozzle assembly 50. Accordingly, the dimensions of machined forward faces 62 and 66 may determine the dimensions of other surfaces of turbine nozzle assembly 50 that are machined and/or inspected subsequent to forward faces 62 and 66. Accurately machining forward faces 62 and 66 according to predetermined dimensions may therefore facilitate accurately manufacturing a finished size and shape of turbine nozzle assembly 50 relative to predetermined dimensions. To facilitate accurate machining of forward faces 62 and 66, fixture assembly 100 includes a plurality of datum location points 132, 134, 136, 138, 140, and 142 for locating turbine nozzle assembly datums 70, 72, 74, 76, 78, and 80, respectively. More specifically, when turbine nozzle assembly datums 70, 72, 74, 76, 78, and 80 are aligned with datum location points 132, 134, 136, 138, 140, and 142, respectively, turbine nozzle assembly 50 is orientated relative to fixture 102 for machining and/or inspecting forward faces 62 and 66 using a machining and/or inspecting tool adjacent fixture assembly 100, as will be described in more detail below.

Figure 8:
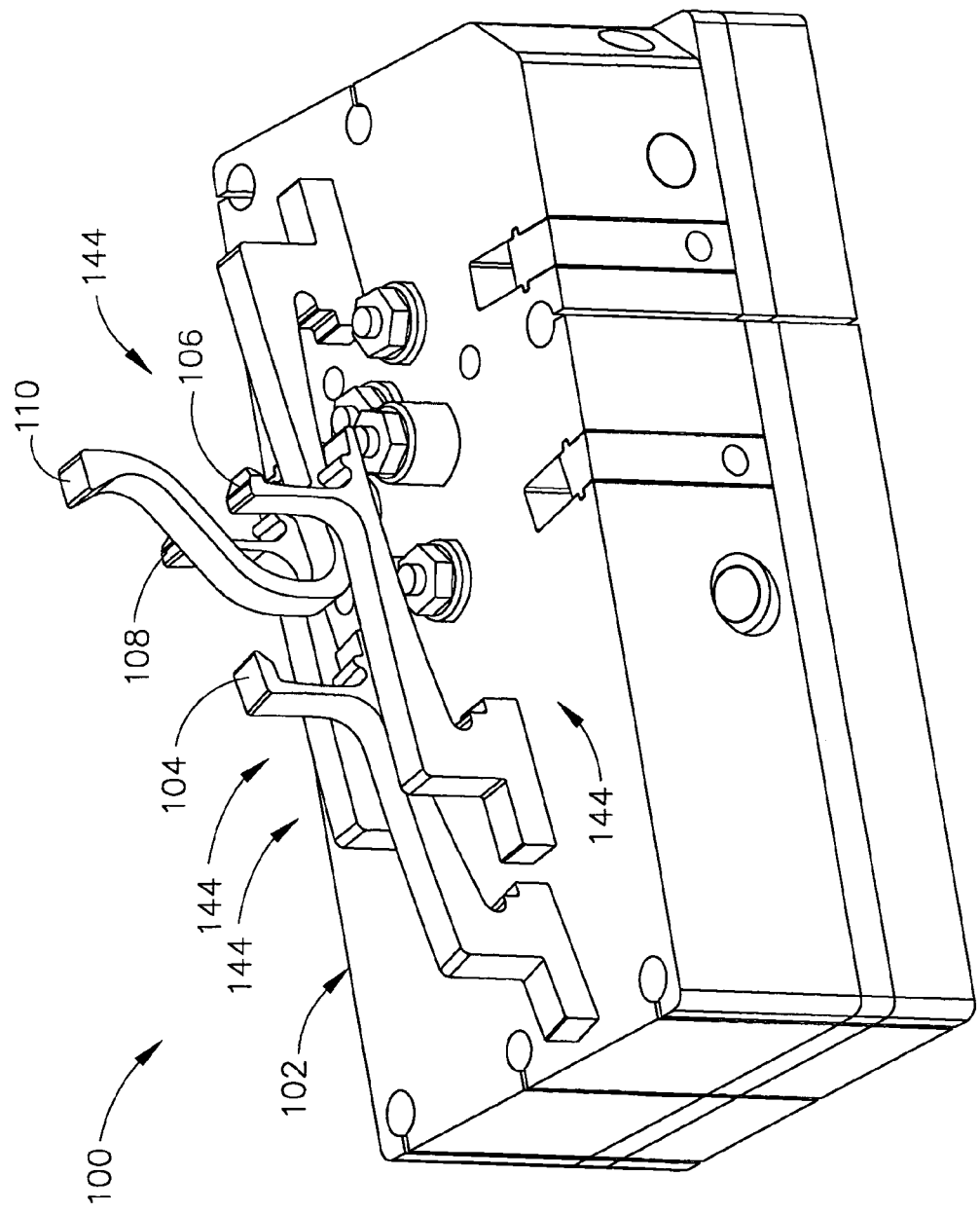
FIG. 8 is a perspective view of a portion of the exemplary fixture assembly shown in FIGS. 4-7 illustrating an exemplary embodiment of a plurality of biasing mechanisms for use with the exemplary fixture assembly shown in FIGS. 4-7.
Figure 9:
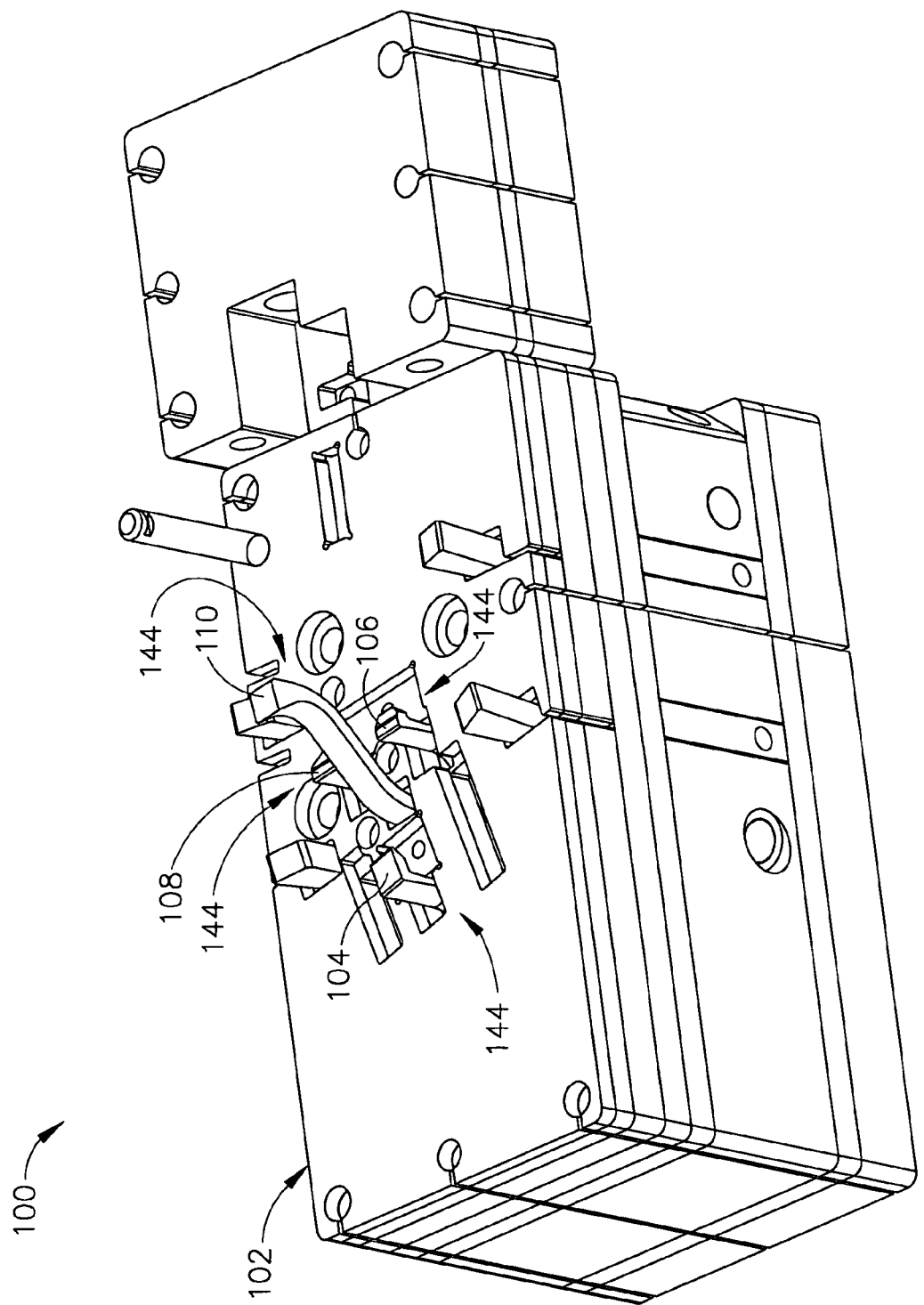
FIG. 9 is another perspective view of a portion of the exemplary fixture assembly shown in FIGS. 4-7 illustrating the plurality of biasing mechanisms shown in FIG. 8.

FIGS. 8 and 9 are perspective views of a portion of fixture assembly 100 illustrating biasing mechanisms 104, 106, 108, and 110. Although four biasing mechanisms 104, 106, 108, and 110 are illustrated, fixture assembly 100 may include any number of biasing mechanisms that function similar to biasing mechanisms 104, 106, 108, and 110 as described and illustrated herein. Moreover, although biasing mechanisms 104, 106, 108, and 110 are illustrated as springs fixedly coupled to fixture 102, biasing mechanisms 104, 106, 108, and 110 may be any biasing mechanisms and may be coupled to fixture 102 in any way, manner, fashion, configuration, and/or by any means. Generally, biasing mechanisms 104, 106, 108, and 110 facilitate fixedly securing turbine nozzle assembly 50 (shown in FIGS. 2, 3, 6, and 7) to fixture 102 and, in some embodiments, facilitate aligning turbine nozzle datums 70, 72, 74, 76, 78, and 80 (shown in FIG. 3) with fixture assembly datum location points 132, 134, 136, 138, 140, and 142 (shown in FIGS. 4 and 5), respectively. More specifically, and as described in more detail below, biasing mechanisms 104, 106, 108, and 110 may each be moved against bias from a biased position 144 to another position (not shown in FIGS. 8 and 9) enabling turbine nozzle assembly 50 to be positioned on fixture 102 without interference from biasing mechanisms 104, 106, 108, and 110. Once turbine nozzle assembly 50 is positioned on fixture 102, biasing mechanisms 104, 106, 108, and 110 can be released to move toward biased position 144 and into contact with turbine nozzle assembly 50 to apply force thereto.

Figure 10:
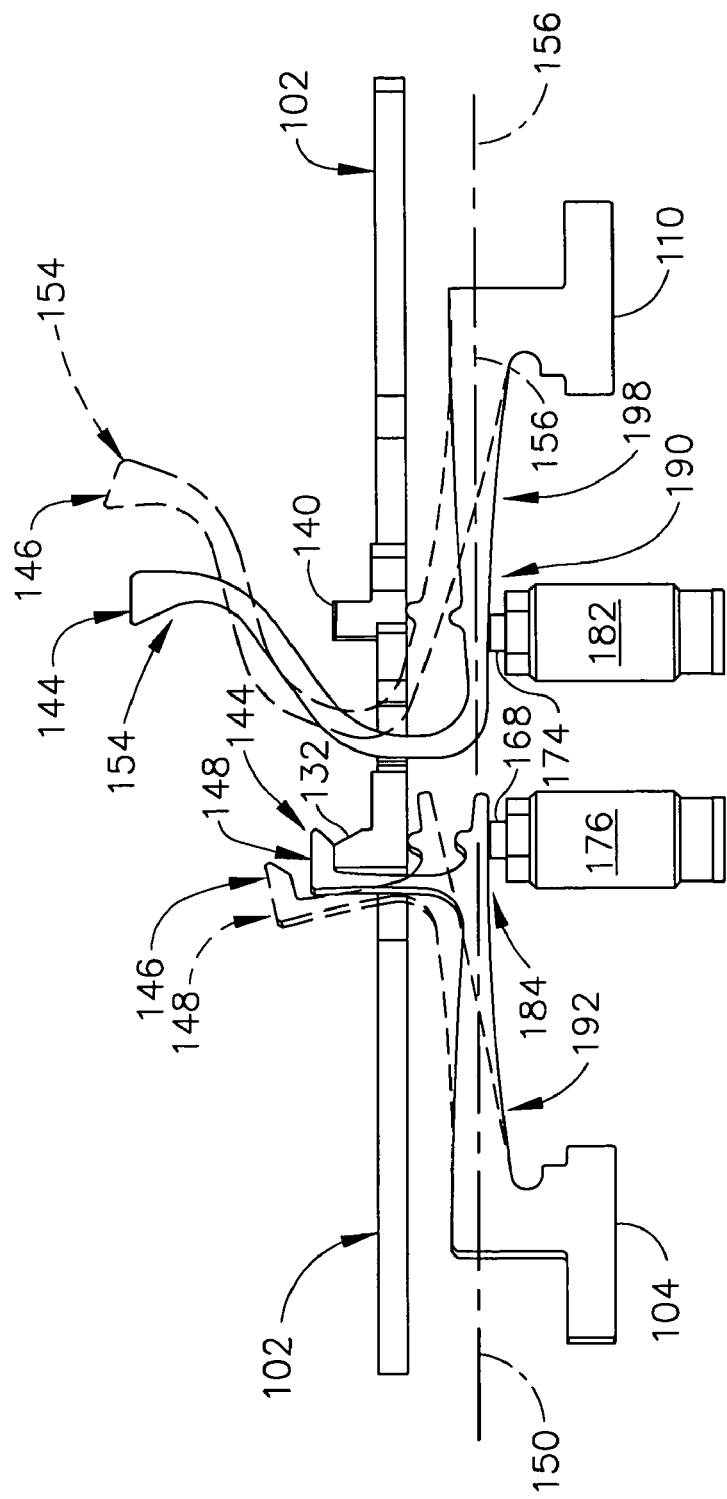
FIG. 10 is a cross-sectional view of a portion of the exemplary fixture assembly shown in FIGS. 4-7 and the exemplary turbine nozzle assembly shown in FIGS. 2 and 3 illustrating movement of some of the biasing mechanisms shown in FIGS. 8 and 9.
Figure 11:
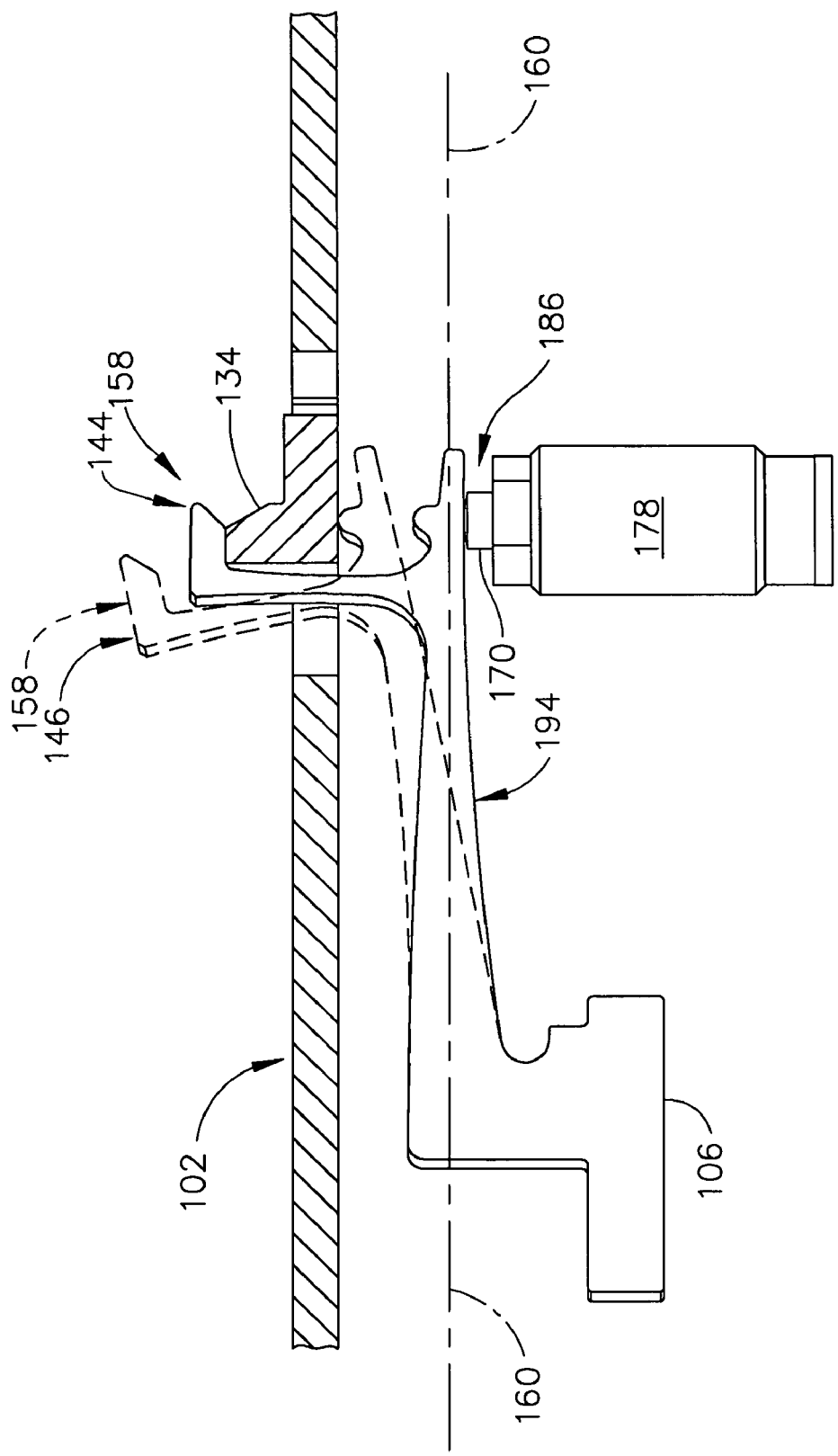
FIG. 11 is another cross-sectional view of a portion of the exemplary fixture assembly shown in FIGS. 4-7 and the exemplary turbine nozzle assembly shown in FIGS. 2, 3, 6, and 7 illustrating movement of some of the biasing mechanisms shown in FIGS. 8 and 9.
Figure 12:
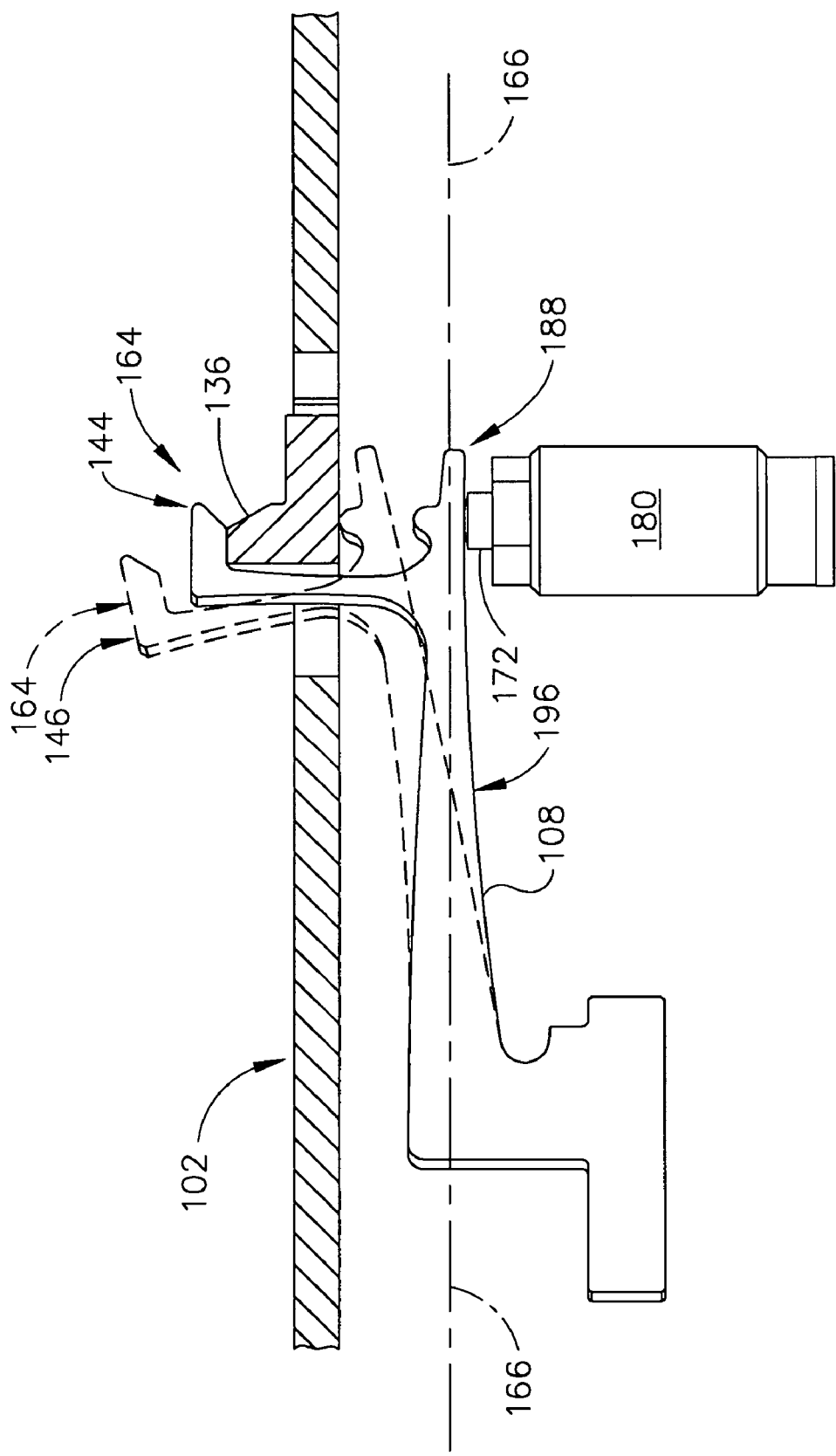
FIG. 12 is another cross-sectional view of a portion of the exemplary fixture assembly shown in FIGS. 4-7 and the exemplary turbine nozzle assembly shown in FIGS. 2, 3, 6, and 7 illustrating movement of some of the biasing mechanisms shown in FIGS. 8 and 9.

FIG. 10-12 are cross-sectional views of a portion of fixture assembly 100 and turbine nozzle assembly 50 illustrating movement of biasing mechanisms 104, 110, 106, and 108, respectively, between biased position 144 and another position 146. Specifically, FIG. 10 illustrates movement of biasing mechanisms 104 and 110 between biased position 144 and position 146, FIG. 11 illustrates movement of biasing mechanism 106 between biased position 144 and position 146, and FIG. 12 illustrates movement of biasing mechanism 108 between biased position 144 and position 146. Generally, biasing mechanisms 104, 106, 108, and 110 are moved from biased position 144 to position 146 to accommodate positioning turbine nozzle assembly 50 (shown in FIGS. 2 and 3) on fixture 102 such that turbine nozzle datums 70, 72, 74, 76, 78, and 80 (shown in FIG. 3) are adjacent fixture assembly datum location points 132, 134, 136, 138 (shown in FIGS. 4 and 5), 140 (shown in FIGS. 4 and 5), and 142, respectively.

Referring to FIG. 10, biasing mechanism 104 is moved from biased position 144 to position 146 to accommodate positioning turbine nozzle assembly 50 on fixture 102 such that turbine nozzle datum 70 is adjacent fixture assembly datum location point 132. Specifically, an end portion 148 of biasing mechanism 104 is moved generally upwardly away from fixture 102 and fixture assembly datum location point 132, and generally away from fixture assembly datum location point 132 along a longitudinal axis 150 of biasing mechanism 104. Accordingly, a trailing edge portion 152 (shown in FIG. 3) of turbine nozzle assembly airfoil 52 that includes datum 70 can be positioned without interference from biasing mechanism 104 such that turbine nozzle assembly datum 70 is adjacent fixture assembly datum location point 132. Biasing mechanism 110 is moved from biased position 144 to position 146 to accommodate positioning turbine nozzle assembly airfoil 52 such that datum 70 is adjacent datum location point 132. Specifically, an end portion 154 of biasing mechanism 110 is moved generally upwardly away from fixture 102 and generally away from fixture assembly datum location point 132 along a longitudinal axis 156 of biasing mechanism 110. Accordingly, when biasing mechanisms 104 and 110 are in position 146, turbine nozzle assembly 50, and more specifically airfoil 52, can be positioned on fixture 102 without interference from biasing mechanisms 104 and 110 such that turbine nozzle datum 70 is generally adjacent fixture assembly datum location point 132.

Referring to FIG. 11, biasing mechanism 106 is moved from biased position 144 to position 146 to accommodate positioning turbine nozzle assembly 50 on fixture 102 such that turbine nozzle datum 72 is adjacent fixture assembly datum location point 134. Specifically, an end portion 158 of biasing mechanism 106 is moved generally upwardly away from fixture 102 and fixture assembly datum location point 134, and generally away from fixture assembly datum location point 134 along a longitudinal axis 160 of biasing mechanism 106. Accordingly, a trailing edge portion 162 (shown in FIG. 3) of turbine nozzle assembly airfoil 53 that includes datum 72 can be positioned without interference from biasing mechanism 106 such that turbine nozzle assembly datum 72 is adjacent fixture assembly datum location point 134. Additionally, movement of biasing mechanism 106 from biased position 144 to position 146 facilitates positioning turbine nozzle assembly datum 80 adjacent fixture assembly datum location point 142.

Referring to FIG. 12, biasing mechanism 108 is moved from position 144 to position 146 to accommodate positioning turbine nozzle assembly 50 on fixture 102 such that turbine nozzle datum 74 is adjacent fixture assembly datum location point 136. Specifically, an end portion 164 of biasing mechanism 108 is moved generally upwardly away from fixture 102 and fixture assembly datum location point 136, and generally away from fixture assembly datum location point 136 along a longitudinal axis 166 of biasing mechanism 108. Accordingly, trailing edge portion 162 of turbine nozzle assembly airfoil 53 that includes datum 74 can be positioned without interference from biasing mechanism 108 such that turbine nozzle assembly datum 74 is adjacent fixture assembly datum location point 136. Additionally, movement of biasing mechanism 108 from biased position 144 to position 146 facilitates positioning turbine nozzle assembly datum 80 adjacent fixture assembly datum location point 142.

Once turbine nozzle assembly 50 is positioned on fixture 102 such that turbine nozzle assembly datums 70, 72, 74, and 78 are adjacent fixture assembly datum location points 132, 134, 136, and 140, biasing mechanisms 104, 106, 108, and 110 are released to move toward biased position 144 and into contact with turbine nozzle assembly 50 to apply force thereto.

Biasing mechanisms 104, 106, 108, and 110 may be moved using any suitable means, such as, but not limited to, hydraulic, electrical, and/or pneumatic power. In the exemplary embodiment, biasing mechanisms 104, 106, 108, and 110 are moved from biased position 144 to the position 146 using a respective actuating member 168, 170, 172, and 174 operatively coupled to a respective hydraulic cylinder 176, 178, 180, and 182. Specifically, actuating members 168, 170, 172, and 174 are moved upwardly by respective hydraulic cylinders 176, 178, 180, and 182 to apply force to a respective portion 184, 186, 188, and 190 of biasing mechanisms 104, 106, 108, and 110. Actuating members 168, 170, 172, and 174 thereby move respective biasing mechanism portions 184, 186, 188, and 190 such that respective biasing mechanism portions 184, 186, 188, and 190 move into position 146 against the bias of a respective body 192, 194, 196, and 198 of biasing mechanisms 104, 106, 108, and 110.

Figure 13:
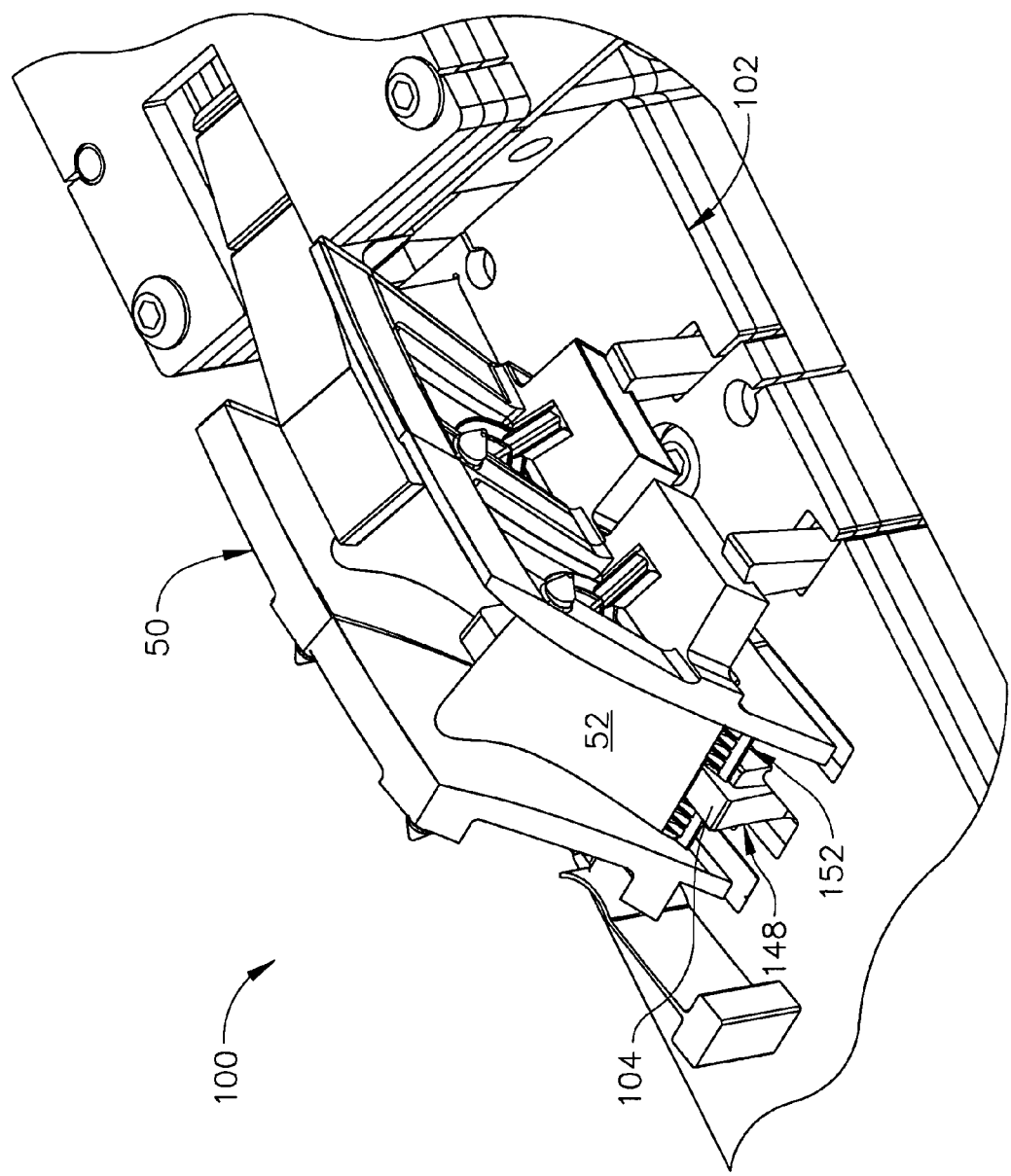
FIG. 13 is a perspective view of a portion of the exemplary fixture assembly shown in FIGS. 4-7 illustrating a portion of the exemplary turbine nozzle assembly shown in FIGS. 2, 3, 6, and 7 coupled thereto.

As described above, biasing mechanisms 104, 106, 108, and 110 facilitate fixedly securing turbine nozzle assembly 50 to fixture 102, and may also facilitate aligning turbine nozzle datums 70, 72, 74, 76, 78, and 80 with fixture assembly datum location points 132, 134, 136, 138, 140, and 142, respectively. More specifically, FIG. 13 is a perspective view of a portion of fixture assembly 100 illustrating biasing mechanism 104 contacting, and applying force to, turbine nozzle assembly 50, and more specifically trailing edge portion 152 of airfoil 52. The bias of biasing mechanism 104 facilitates holding turbine nozzle datum 70 (shown in FIG. 3) in alignment with fixture assembly datum location point 132 (shown in FIGS. 4, 5, and 10). In some embodiments, movement of biasing mechanism 104 from position 146 (shown in FIG. 10) toward biased position 144 (shown in FIG. 10) facilitates aligning turbine nozzle datum 70 with datum location point 132. Although biasing mechanism 104 may have other sizes and shapes, in the exemplary embodiment, end portion 148 of biasing mechanism 104 is sized and shaped to engage trailing edge portion 152 of turbine nozzle assembly airfoil 52.

Figure 14:
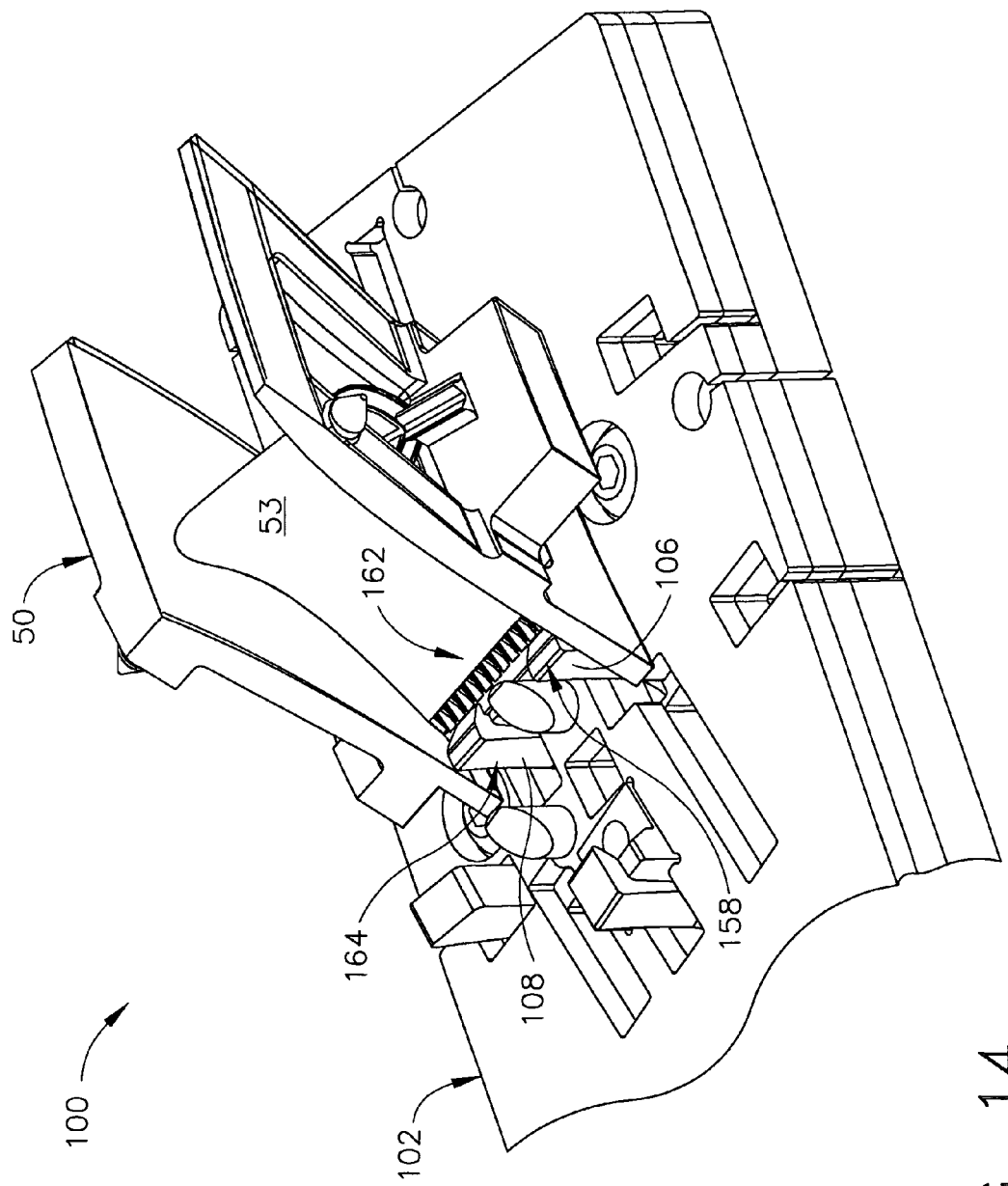
FIG. 14 is another perspective view of a portion of the exemplary fixture assembly shown in FIGS. 4-7 illustrating a portion of the exemplary turbine nozzle assembly shown in FIGS. 2, 3, 6, and 7 coupled thereto.

FIG. 14 is a perspective view of a portion of fixture assembly 100 illustrating biasing mechanisms 106 and 108 contacting, and applying force to, turbine nozzle assembly 50, and more specifically trailing edge portion 162 of airfoil 53. The bias of biasing mechanisms 106 and 108 facilitates holding turbine nozzle datums 72, 74, and 80 (shown in FIG. 3) in alignment with fixture assembly datum location points 134, 136, and 142 (shown in FIGS. 4 and 5), respectively. In some embodiments, movement of biasing mechanisms 106 and 108 from position 146 (shown in FIGS. 11 and 12) toward biased position 144 (shown in FIGS. 11 and 12) facilitates aligning turbine nozzle datums 72, 74, and 80 with fixture assembly datum location points 134, 136, and 142, respectively. Although biasing mechanisms 106 and 108 may have other sizes and shapes, in the exemplary embodiment, end portions 158 and 164 of biasing mechanisms 106 and 108, respectively, are each sized and shaped to engage trailing edge portion 162 of turbine nozzle assembly airfoil 53.

Figure 15:
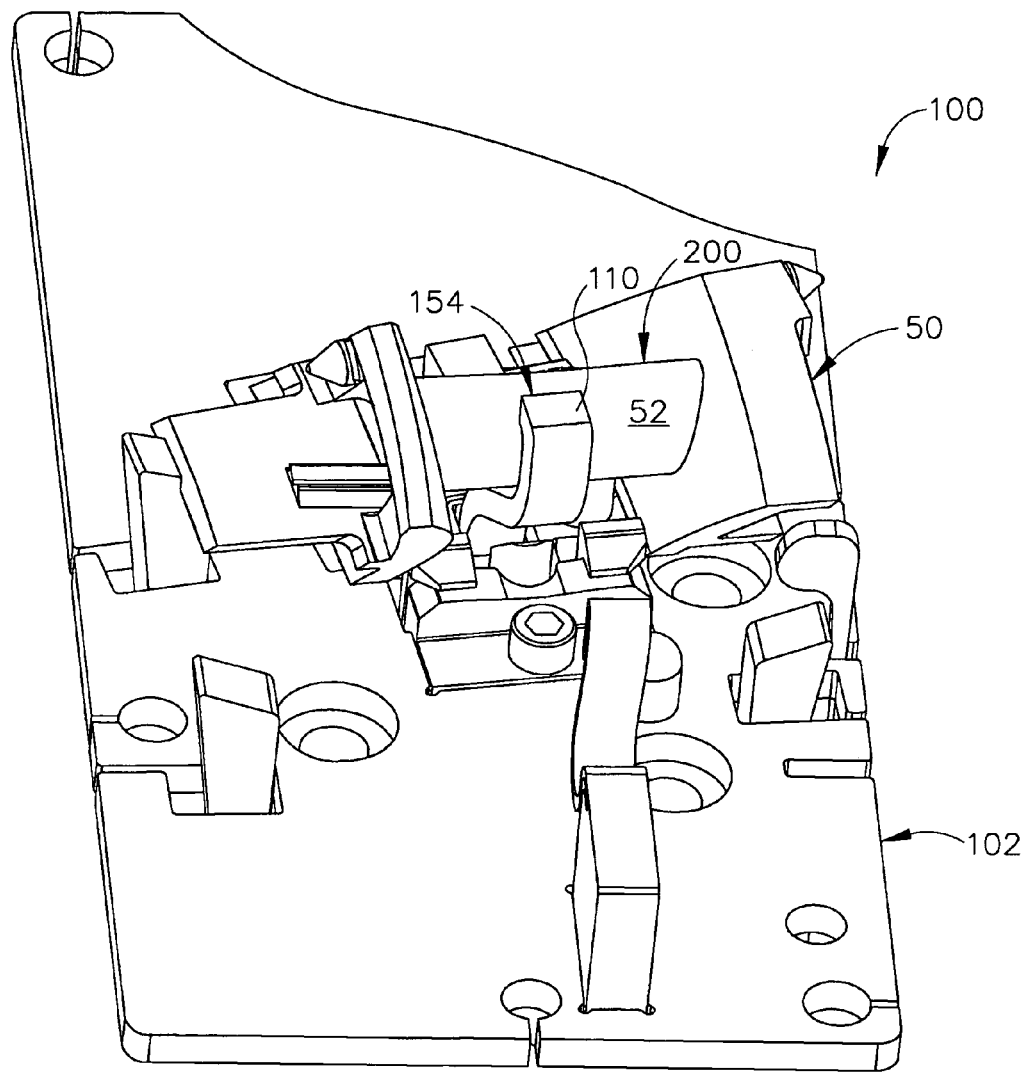
FIG. 15 is another perspective view of a portion of the exemplary fixture assembly shown in FIGS. 4-7 illustrating a portion of the exemplary turbine nozzle assembly shown in FIGS. 2, 3, 6, and 7 coupled thereto.

FIG. 15 is a perspective view of a portion of fixture assembly 100 illustrating biasing mechanism 110 contacting, and applying force to, turbine nozzle assembly 50, and more specifically airfoil 52. The bias of biasing mechanism 110 facilitates holding turbine nozzle datum 70 (shown in FIG. 3) in alignment with fixture assembly datum location point 132 (shown in FIGS. 4, 5, and 10). In some embodiments, movement of biasing mechanism 110 from position 146 (shown in FIG. 10) toward biased position 144 (shown in FIG. 10) facilitates aligning turbine nozzle datum 70 with fixture assembly datum location point 132. Although biasing mechanism 110 may have other sizes and shapes, in the exemplary embodiment, end portion 154 of biasing mechanism 110 is sized and shaped to engage a leading edge portion 200 of turbine nozzle assembly airfoil 52.

Referring again to FIG. 4, although four biasing mechanisms 112, 114, 116, and 118 are illustrated, fixture assembly 100 may include any number of biasing mechanisms that function similar to biasing mechanisms 112, 114, 116, and 118 as described and illustrated herein. Moreover, although biasing mechanisms 112, 114, 116, and 118 are illustrated as springs fixedly coupled to fixture 102, biasing mechanisms 112, 114, 116, and 118 may be any biasing mechanisms and may be coupled to fixture 102 in any way, manner, fashion, configuration, and/or by any means. Generally, biasing mechanisms 112, 114, 116, and 118 facilitate fixedly securing turbine nozzle assembly 50 (shown in FIGS. 2, 3, 6, and 7) to fixture 102 and, in some embodiments, facilitate aligning turbine nozzle datums 70, 72, 74, 76, 78, and 80 (shown in FIG. 3) with fixture assembly datum location points 132, 134, 136, 138, 140, and 142 (shown in FIGS. 4 and 5), respectively. More specifically, as turbine nozzle assembly 50 is positioned on fixture 102 such that turbine nozzle assembly datums 70, 72, 74, and 80 are adjacent fixture assembly datum location points 132, 134, 136, and 142, biasing mechanisms 112, 114, 116, and 118 are moved against bias by turbine nozzle assembly 50 away from a biased position 200. The bias of biasing mechanisms 112, 114, 116, and 118 toward biased position 200 applies force to turbine nozzle assembly 50 to fixedly secure assembly 50 to fixture 102.

Figure 16:
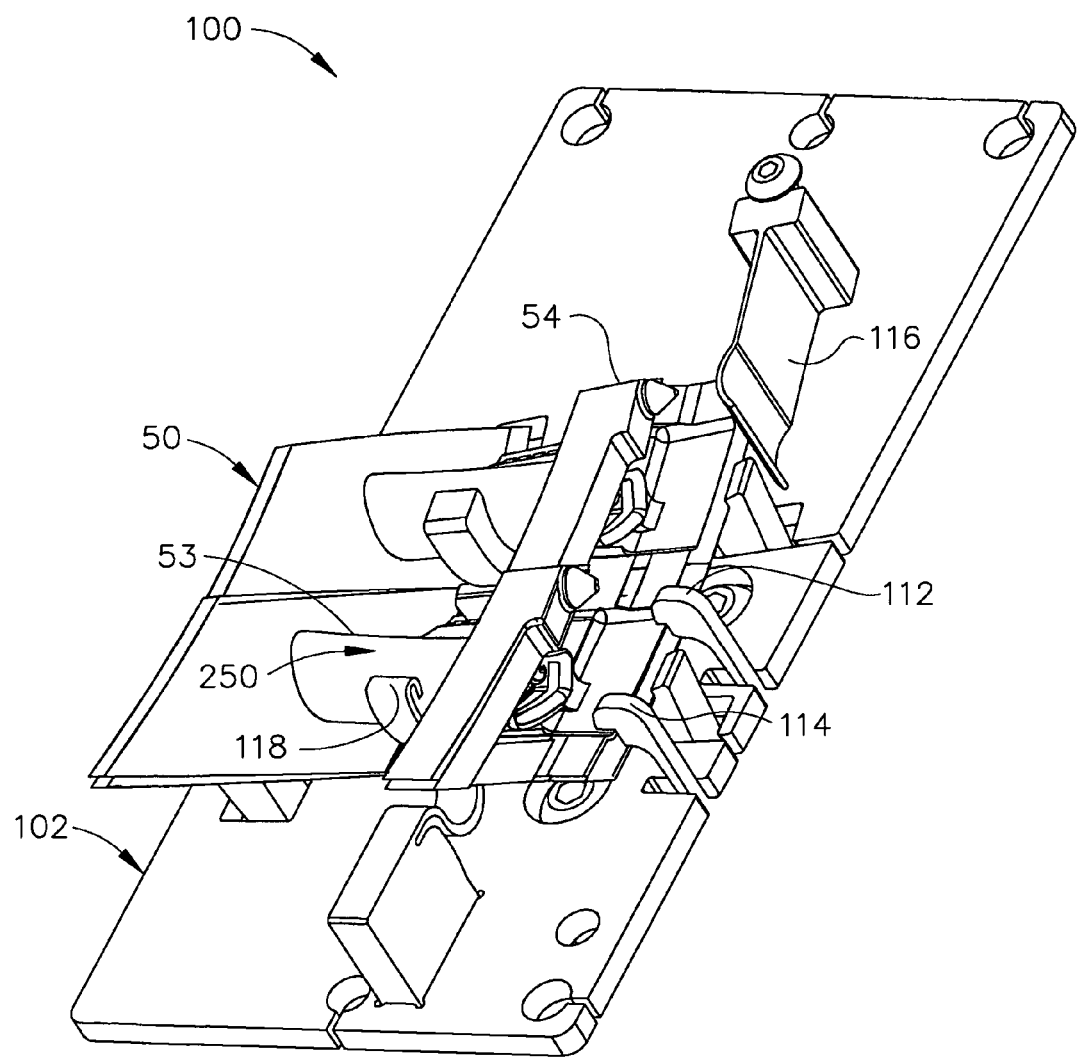
FIG. 16 is another perspective view of a portion of the exemplary fixture assembly shown in FIGS. 4-7 illustrating a portion of the exemplary turbine nozzle assembly shown in FIGS. 2, 3, 6, and 7 coupled thereto.

Biasing mechanisms 112, 114, 116, and 118 may also facilitate aligning turbine nozzle datums 70, 72, 74, 76, 78, and 80 with fixture assembly datum location points 132, 134, 136, 138, 140, and 142, respectively. More specifically, FIG. 16 is a perspective view of a portion of fixture assembly 100 illustrating biasing mechanisms 112, 114, and 116 applying force to outer band 54 of turbine nozzle assembly 50, and biasing mechanism 118 applying force to a leading edge portion 250 of airfoil 53. In some embodiments, bias of biasing mechanisms 112, 114, 116, and 118 toward biased position 200 (shown in FIG. 4) facilitates aligning turbine nozzle datums 70, 72, 74, 76, 78, and 80 (shown in FIG. 3) with fixture assembly datum location points 132, 134, 136, 138, 140, and 142 (shown in FIGS. 4 and 5), respectively. Although biasing mechanisms 112, 114, 116, and 118 may have other sizes and shapes, in the exemplary embodiment, biasing mechanisms 112, 114, 116, and 118 are sized and shaped to engage outer band 54 or leading edge portion 250 of turbine nozzle assembly airfoil 53.

Figure 17:
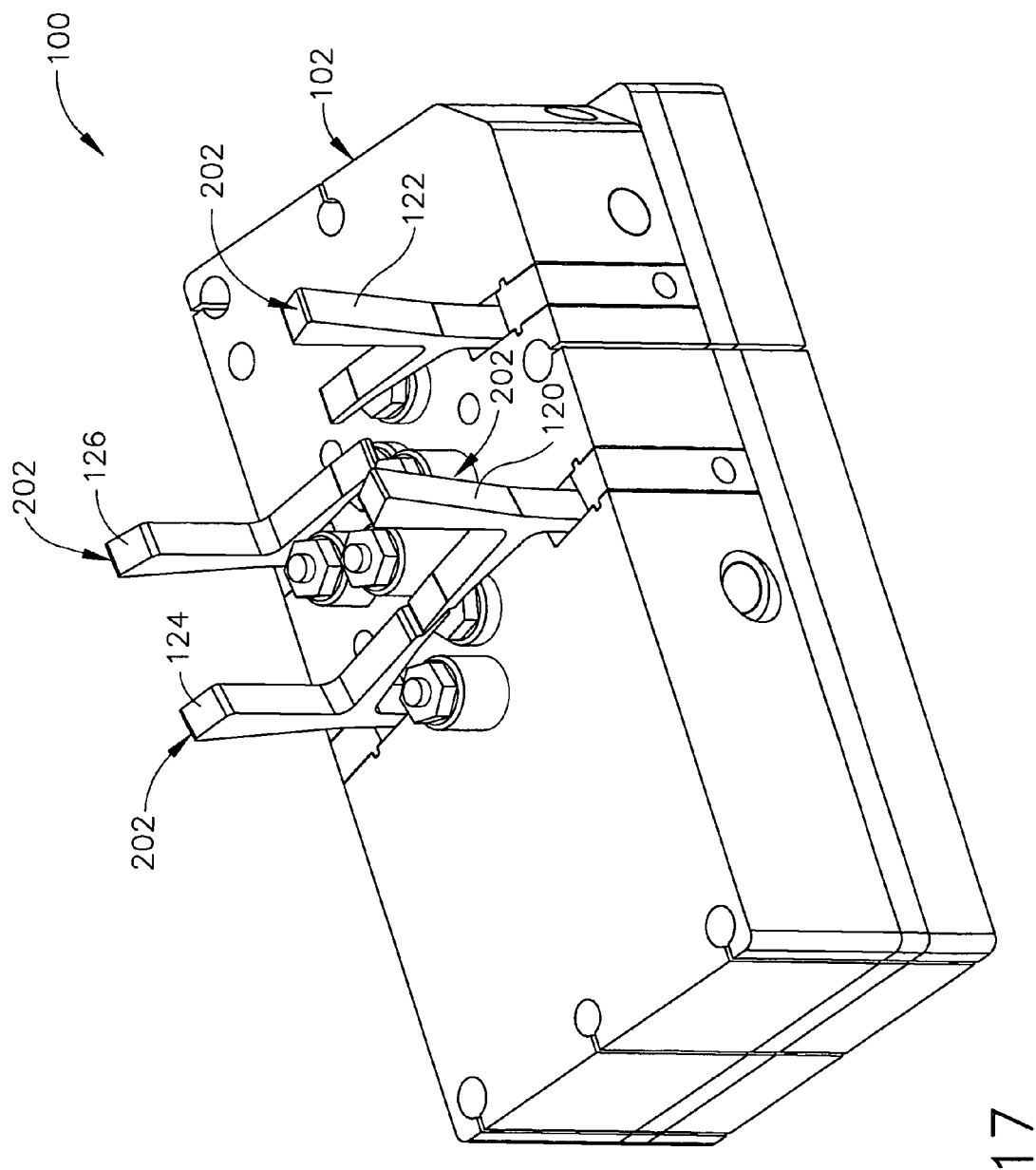
FIG. 17 is a perspective view of a portion of the exemplary fixture assembly shown in FIGS. 4-7 illustrating an exemplary embodiment of a plurality of work supports for use with the exemplary fixture assembly shown in FIGS. 4-7.

FIG. 17 is a perspective view of a portion of fixture assembly 100 illustrating work supports 120, 122, 124, and 126. Although four work supports 120, 122, 124, and 126 are illustrated, fixture assembly 100 may include any number of work supports that function similar to work supports 120, 122, 124, and 126 as described and illustrated herein. Moreover, although work supports 120, 122, 124, and 126 are illustrated as springs fixedly coupled to fixture 102, work supports 120, 122, 124, and 126 may be any biasing mechanisms and may be coupled to fixture 102 in any way, manner, fashion, configuration, and/or by any means. Generally, work supports 120, 122, 124, and 126 facilitate supporting turbine nozzle assembly 50 (shown in FIGS. 2, 3, 6, and 7) on fixture 102. More specifically, and as described in more detail below, work supports 120, 122, 124, and 126 may each be moved against bias from a biased position 202 to another position (not shown in FIG. 17) enabling turbine nozzle assembly 50 to be positioned on fixture 102 without interference from work supports 120, 122, 124, and 126. Once turbine nozzle assembly 50 is positioned on fixture 102, work supports 120, 122, 124, and 126 can be released to move toward biased position 202 and into contact with turbine nozzle assembly 50 to provide support thereto.

Figure 18:
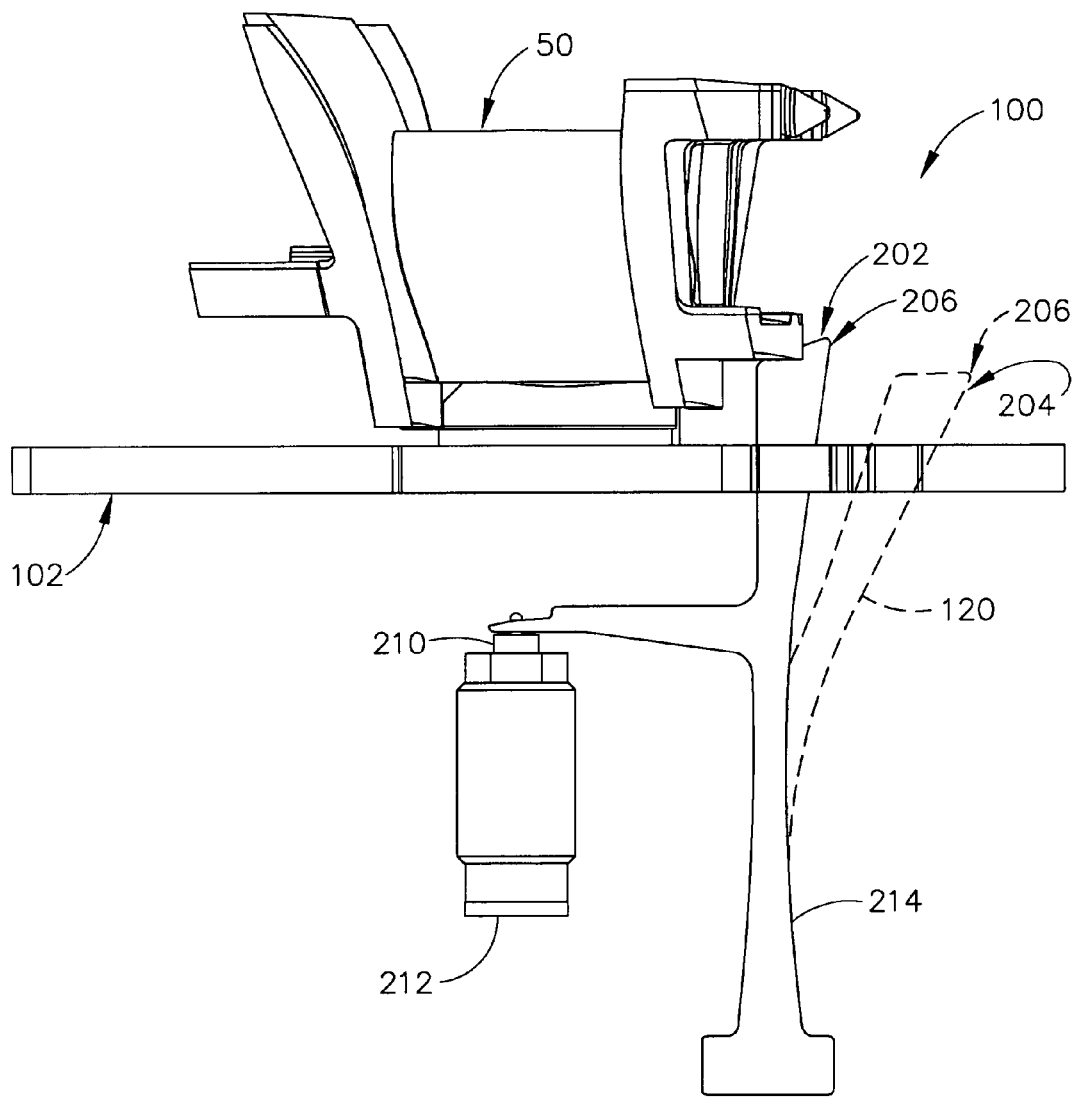
FIG. 18 is a cross-sectional view of a portion of the exemplary fixture assembly shown in FIGS. 4-7 and the exemplary turbine nozzle assembly shown in FIGS. 2, 3, 6, and 7 illustrating movement of the work supports shown in FIG. 17.

FIG. 18 is a cross-sectional view of a portion of fixture assembly 100 and turbine nozzle assembly 50 illustrating movement of work support 120 between biased position 202 and another position 204. Work supports 122, 124, and 126 function similarly to work support 120, and although described herein, only function of work support 120 is illustrated herein. Generally, work supports 120, 122, 124, and 126 are moved from biased position 202 to position 204 to accommodate positioning turbine nozzle assembly 50 on fixture 102 such that turbine nozzle datums 70, 72, 74, 76, 78, and 80 (shown in FIG. 3) are adjacent fixture assembly datum location points 132, 134, 136, 138, 140, and 142 (shown in FIGS. 4 and 5), respectively. Specifically, an end portion 206 of each of work supports 120, 122, 124, and 126 is moved generally away from turbine nozzle assembly inner band 56 and turbine nozzle assembly outer band 54, respectively. Accordingly, when work supports 120, 122, 124, and 126 are in position 204, turbine nozzle assembly 50 can be positioned on fixture 102 without interference from work supports 120, 122, 124, and 126.

Once turbine nozzle assembly 50 is positioned on fixture 102 such that turbine nozzle assembly datums 70, 72, 74, and 80 are adjacent fixture assembly datum location points 132, 134, 136, and 142, work supports 120, 122, 124, and 126 are released to move toward biased position 202 and into contact with turbine nozzle assembly 50 to provide support thereto. Specifically, work supports 120 and 122 support turbine nozzle assembly inner band 56, and work supports 124 and 126 support turbine nozzle assembly outer band 54.

Work supports 120, 122, 124, and 126 may be moved using any suitable means, such as, but not limited to, hydraulic, electrical, and/or pneumatic power. In the exemplary embodiment, work supports 120, 122, 124, and 126 are moved from biased position 202 to position 204 using an actuating member 210 operatively coupled to a hydraulic cylinder 212. Specifically, actuating members 210, are moved upwardly by hydraulic cylinders 212 to apply force to work supports 120, 122, 124, and 126. Actuating members 210 thereby move work supports 120, 122, 124, and 126 such that end portions 206 move into position 204 against the bias of a body 214 of work supports 120, 122, 124, and 126.

Figure 19:
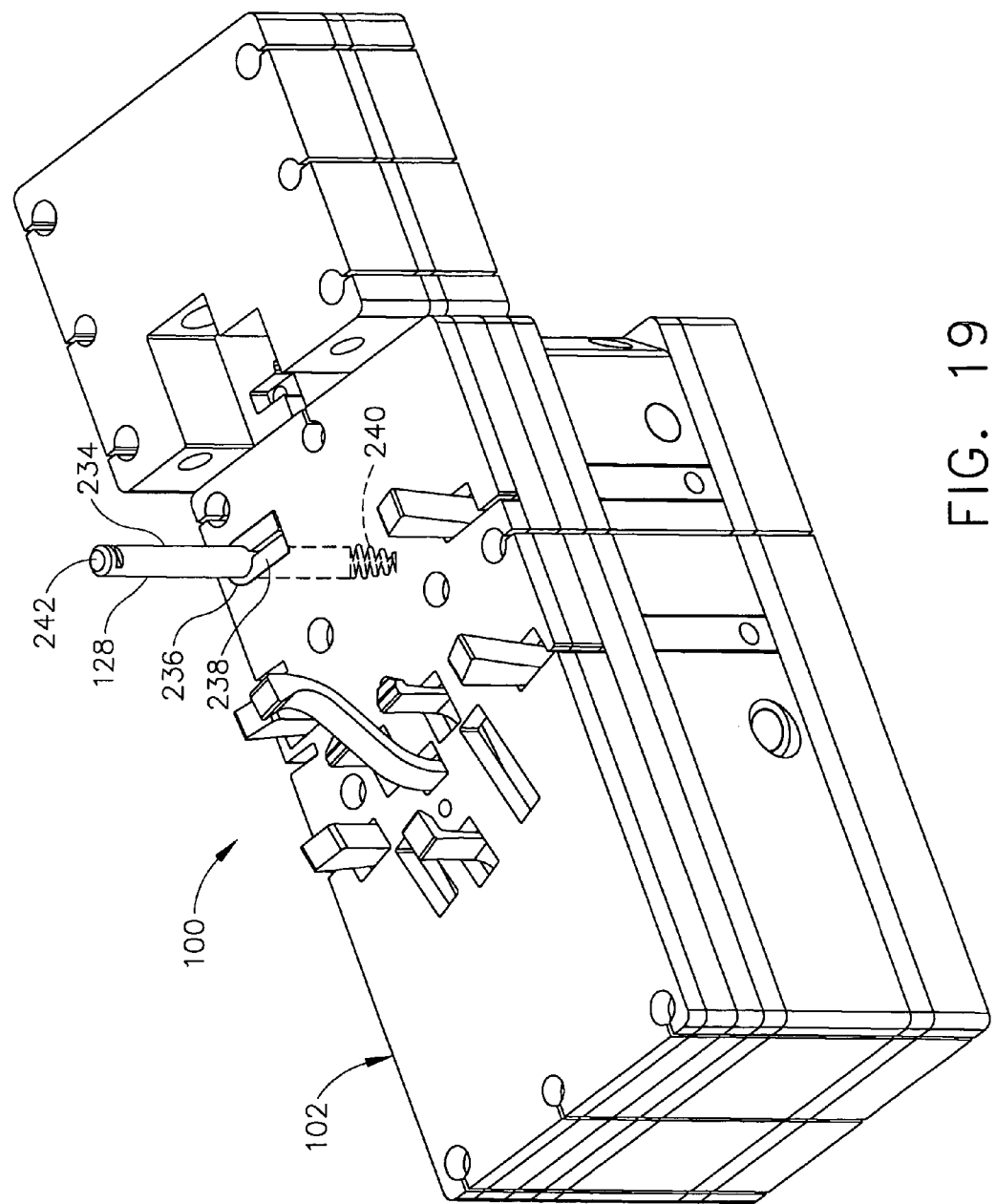
FIG. 19 is a perspective view of a portion of the exemplary fixture assembly shown in FIGS. 4-7 illustrating an exemplary embodiment of another work support for use with the exemplary fixture assembly shown in FIGS. 4-7.

FIG. 19 is a perspective view of a portion of fixture assembly 100 illustrating work support 128. Work support 128 generally supports turbine nozzle assembly outer band 54 (shown in FIGS. 2 and 3) and includes a body 234 received within an opening 236 in fixture 102. A collet 238 is also received within opening 236 for restraining axial movement of work support 128 by applying radially inward force to work support body 234. Although collet 238 may apply force to body 234 using any means, in some embodiments collet 238 is coupled to a source (not shown) of hydraulic, pneumatic, and/or electrical power for applying radially inward force work support body 234. In some embodiments, a biasing mechanism 240 is coupled to work support body 234 for biasing work support upwardly within fixture opening 236. Although biasing mechanism 240 may be any biasing mechanism, in the exemplary embodiment biasing mechanism 240 is a helical spring. In operation, turbine nozzle assembly 50 (shown in FIGS. 2 and 3) is positioned on an end portion 242 of work support 128 such that the weight of assembly 50 moves work support 128 downwardly within fixture opening 236 against the bias of biasing mechanism 240. Once turbine nozzle assembly is in position, collet 238 can be activated to fixedly hold work support 128 in place.

Referring again to FIGS. 4 and 6, clamp 130 facilitates fixedly securing turbine nozzle assembly 50 to fixture 102 by applying force thereto. Specifically, clamp 130 is movable between a position 244 (shown in FIG. 4) allowing turbine nozzle assembly 50 to be positioned on fixture 102 without interference from clamp 130, and a position 246 (shown in FIG. 6) wherein an end portion 248 of clamp 130 applies force to turbine nozzle assembly 50 to facilitate fixedly securing turbine nozzle assembly 50 to fixture 102. Clamp 130 may be moved using any suitable means, such as, but not limited to, hydraulic, electrical, and/or pneumatic power. Although clamp 130 may have other sizes and shapes for engaging and applying force to other portions of turbine nozzle assembly 50, in the exemplary embodiment, clamp end portion 248 is sized and shaped to engage leading edge portion 250 of turbine nozzle assembly airfoil 53.

The above-described fixture assembly 100 facilitates accurately manufacturing turbine nozzle assembly 50, and may also facilitate reducing a cycle time of manufacturing turbine nozzle assembly 50, thereby possibly reducing an overall cost of manufacturing assembly 50. Specifically, because biasing mechanisms 104, 106, 108, 110, 112, 114, 116, and/or 118 may facilitate alignment of datums 70, 72, 74, 76, 78, and 80 with datum location points 132, 134, 136, 138, 140, and 142, respectively, a predetermined orientation of turbine nozzle assembly 50 relative to fixture 102 that is desired for manufacturing assembly 50 may be accomplished in less time and without specialized operator training. Accordingly, a repeatability of manufacturing turbine nozzle assembly 50 may be increased while a cycle time of manufacturing assembly 50 may be reduced. Furthermore, because some surfaced machined on turbine nozzle assembly 50 using fixture assembly 102, such as forward faces 62 and 66, may be used to locate turbine nozzle assembly 50 for subsequent manufacturing processes, accurately machining such surfaces using fixture assembly 100 may facilitate accurately manufacturing a finished size and shape of turbine nozzle assembly 50 relative to predetermined dimensions. Moreover, if clamp 130 fails, the bias of biasing mechanisms 104, 106, 108, 110, 112, 114, 116, and 118 may facilitate fixedly securing turbine nozzle assembly 50 to fixture 102. Accordingly, turbine nozzle assembly 50 may be securely coupled to fixture 102 even when clamp 130 fails, thereby possibly increasing repeatability of manufacture of turbine nozzle assembly 50.

Although the assemblies and methods described and/or illustrated herein are described and/or illustrated with respect to gas turbine engine components, and more specifically a turbine nozzle assembly for a gas turbine engine, practice of the assemblies and methods described and/or illustrated herein is not limited to turbine nozzle assemblies, nor gas turbine engine components generally. Rather, the assemblies and methods described and/or illustrated herein are applicable to any component and/or any manufacturing process.

Exemplary embodiments of assemblies and methods are described and/or illustrated herein in detail. The assemblies and methods are not limited to the specific embodiments described herein, but rather, components of each member and components of each assembly, as well as steps of each method, may be utilized independently and separately from other components and steps described herein. Each component, and each method step, can also be used in combination with other components and/or method steps.

When introducing elements/components/etc. of the assemblies and methods described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for manufacturing a turbine nozzle assembly using a fixture including a biasing mechanism, said method comprising:
   moving the biasing mechanism from a biased first position to a second position using at least one of hydraulic, pneumatic, and electrical power;
   positioning the turbine nozzle assembly on a support member coupled to the fixture;
   positioning at least one datum of the turbine nozzle assembly adjacent at least one datum location point on the fixture;
   axially moving the support member against the bias of a spring coupled to the support member;
   aligning the at least one datum with the at least one datum location point by releasing the biasing mechanism such that the biasing mechanism moves from the second position into contact with the turbine nozzle assembly; and
   restraining axial movement of the support member using a collet.

2. A method in accordance with claim 1 further comprising:
   fixedly securing the turbine nozzle assembly to the fixture using the bias of the biasing mechanism.

3. A method in accordance with claim 1 wherein said moving the biasing mechanism comprises moving the biasing mechanism using an actuating member operatively connected to a hydraulic cylinder.

4. A method in accordance with claim 1 further comprising fixedly securing the turbine nozzle assembly to the fixture using a clamp actuated by at least one of hydraulic, pneumatic, and electrical power.

5. A method in accordance with claim 1 wherein the biasing mechanism is a first biasing mechanism, said method further comprising:
   aligning the at least one datum with the at least one datum location point using a second biasing mechanism biased to apply force to the turbine nozzle assembly when the turbine nozzle assembly at least one datum is positioned adjacent the at least one datum location point of the fixture; and
   fixedly securing the turbine nozzle assembly to the fixture using the bias of the second biasing mechanism.

6. A method in accordance with claim 1 wherein restraining axial movement of the support member using a collet comprises applying radially inward force to the support member using the collet, wherein the collet is actuated by at least one of pneumatic, hydraulic, and electrical power.

7. A method in accordance with claim 1 wherein the biasing mechanism is a first biasing mechanism, said method further comprising:
   moving a second biasing mechanism from a biased first position to a second position using at least one of hydraulic, pneumatic, and electrical power;
   positioning the turbine nozzle assembly adjacent the second biasing mechanism; and
   supporting the turbine nozzle assembly by releasing the second biasing mechanism such that the second biasing mechanism moves from the second position into contact with the turbine nozzle assembly.

8. An assembly for use in manufacturing a turbine nozzle assembly, said assembly comprising:
   a fixture having at least one datum location point;
   at least one biasing mechanism coupled to said fixture and comprising a biased first position and a second position, said at least one biasing mechanism configured to align at least one datum of the turbine nozzle assembly with said at least one datum location point by moving from said second position toward said first position and into contact with the turbine nozzle assembly when the turbine nozzle assembly is positioned adjacent said fixture and said at least one biasing mechanism;
   an actuating member coupled to said fixture and configured to move said at least one biasing mechanism against the bias to said second position using at least one of pneumatic, hydraulic, and electrical power; and
   a support member coupled to said fixture and configured to support the turbine nozzle assembly when the turbine nozzle assembly is positioned adjacent said support member and said fixture; and
   a collet coupled to said support member and configured to restrain axial movement of said support member by applying radially inward force to said support member, said collet operatively connected to a source of at least one of hydraulic, pneumatic, and electrical power for applying radially inward force to said support member.

9. An assembly in accordance with claim 8 further comprising a hydraulic cylinder coupled to said actuating member and configured to move said actuating member using hydraulic power.

10. An assembly in accordance with claim 8 further comprising a clamp coupled to said fixture for applying force to the turbine nozzle assembly to fixedly secure the turbine nozzle assembly to said fixture, said clamp operatively connected to a source of at least one of hydraulic, pneumatic, and electrical power for movement of said clamp and for applying force to the turbine nozzle assembly.

11. An assembly in accordance with claim 8 wherein said at least one biasing mechanism is a first biasing mechanism, said assembly further comprising a second biasing mechanism coupled to said fixture and biased to apply force to the turbine nozzle assembly when the turbine nozzle assembly is positioned adjacent said fixture and said second biasing mechanism, said second biasing mechanism configured to align the turbine nozzle assembly at least one datum with said at least one datum location point using the bias, said second biasing mechanism configured to fixedly secure the turbine nozzle assembly to said fixture using the bias.

12. An assembly in accordance with claim 8 further comprising a spring coupled to said support member, said collet configured to retrain axial movement of said support member against the bias of said spring.

13. An assembly in accordance with claim 8 wherein said at least one biasing mechanism is a first biasing mechanism and said at least one actuating member is a first actuating member, said assembly further comprising:
   a second biasing mechanism coupled to said fixture and comprising a biased first position and a second position, said second biasing mechanism configured to support the turbine nozzle assembly by moving from said second position toward said first position and into contact with the turbine nozzle assembly when the turbine nozzle assembly is positioned adjacent said fixture and said second biasing mechanism; and a second actuating member coupled to said fixture and configured to move said second biasing mechanism against the bias from said biased first position of said second biasing mechanism to said second position of said second biasing mechanism.

14. An assembly in accordance with claim 8 wherein said at least one biasing mechanism is configured to fixedly secure the turbine nozzle assembly to said fixture using the bias to said first position.

15. An assembly for use in manufacturing a turbine nozzle assembly, said assembly comprising:

a fixture;

at least one biasing mechanism coupled to said fixture and comprising a biased first position and a second position, said at least one biasing mechanism configured to apply force to the turbine nozzle assembly when the turbine nozzle assembly is positioned adjacent said at least one biasing mechanism and said fixture by moving from said second position toward said first position and into contact with the turbine nozzle assembly to facilitate at least one of aligning the turbine nozzle assembly relative to said fixture, supporting the turbine nozzle assembly, and fixedly securing the turbine nozzle assembly to said fixture;

an actuating member coupled to said fixture and configured to move said at least one biasing mechanism against the bias to said second position using at least one of pneumatic, hydraulic, and electrical power; and a support member coupled to said fixture and configured to support the turbine nozzle assembly when the turbine nozzle assembly is positioned adjacent said support member and said fixture; and a collet coupled to said support member and configured to restrain axial movement of said support member by applying radially inward force to said support member, said collet operatively connected to a source of at least one of hydraulic, pneumatic, and electrical power for applying radially inward force to said support member.

* * * * *